US010931525B2

(12) United States Patent
Iovene et al.

(10) Patent No.: US 10,931,525 B2
(45) Date of Patent: Feb. 23, 2021

(54) MANAGING PLANNED ADJUSTMENT OF ALLOCATION OF RESOURCES IN A VIRTUALISED NETWORK

(71) Applicant: Telefonaktiebolaget LM Ericsson (publ), Stockholm (SE)

(72) Inventors: Massimo Iovene, Salerno (IT); Francesco Mariniello, Salerno (IT); Oliver Speks, Herzogenrath (DE); Peter Woerndle, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 140 days.

(21) Appl. No.: 16/078,268

(22) PCT Filed: Feb. 24, 2016

(86) PCT No.: PCT/EP2016/053889
§ 371 (c)(1),
(2) Date: Aug. 21, 2018

(87) PCT Pub. No.: WO2017/144094
PCT Pub. Date: Aug. 31, 2017

(65) Prior Publication Data
US 2020/0084091 A1    Mar. 12, 2020

(51) Int. Cl.
*H04L 12/24* (2006.01)
*H04L 12/923* (2013.01)
*H04L 12/911* (2013.01)

(52) U.S. Cl.
CPC ........ *H04L 41/082* (2013.01); *H04L 41/0896* (2013.01); *H04L 41/12* (2013.01);
(Continued)

(58) Field of Classification Search
None
See application file for complete search history.

(56) References Cited

U.S. PATENT DOCUMENTS

| 2008/0130622 A1* | 6/2008 | Hiertz | H04L 12/407 |
| | | | 370/348 |
| 2015/0142940 A1 | 5/2015 | McMurry et al. | |
| 2015/0143364 A1* | 5/2015 | Anderson | G06F 9/5088 |
| | | | 718/1 |

FOREIGN PATENT DOCUMENTS

| WO | 2015135611 A1 | 9/2015 |
| WO | 2017008839 A1 | 1/2017 |

OTHER PUBLICATIONS

"IFA009 Service and Domain Orchestrator Requirements", ETSI; Vodafone; NFVIFA(15)00268r2, Apr. 15, 2015, pp. 1-6.
(Continued)

*Primary Examiner* — Brian Whipple
(74) *Attorney, Agent, or Firm* — Murphy, Bilak & Homiller, PLLC

(57) ABSTRACT

A Network Functions Virtualisation Management and Orchestration system, NFV-MANO, for managing resources in a Network Function Virtualisation Infrastructure, NFVI, has elements (NFVO, VNFM) for orchestrating and managing virtual resources to provide a network service and has an allocation element (VIM) for managing an allocation of physical resources for the virtual resources. One of the elements for orchestrating (NFVO, VNFM), obtains (210) information about which of the virtual resources could be affected by a planned adjustment of the allocation, and determines an impact (220) of the planned adjustment on a network service, based on this information. An indication based on the impact on the network service is sent (230) to the allocation element (VIM), which implements the planned allocation according to the indication. This can help enable a better trade off between allocation efficiency and quality of network service.

16 Claims, 22 Drawing Sheets

(52) U.S. Cl.
CPC .......... *H04L 47/762* (2013.01); *H04L 47/781* (2013.01); *H04L 47/821* (2013.01)

(56) References Cited

OTHER PUBLICATIONS

Chiosi, Margaret, et al., "Network Functions Virtualisation (NFV)", SDN & OpenFlow World Congress, Dusseldorf-Germany; http://portal.etsi.org/NFV/NFV_White_Paper3.pdf, Oct. 14-17, 2014, pp. 1-20.

"Draft ETSI GS IFA 010 v0.8.1", Network Functions Virtualisation (NFV) Management and Orchestration Functional Requirements Specification, Jan. 2016, pp. 1-57.

"ETSI GS NFV 001 v1.1.1", Network Functions Virtualisation (NFV); Use Cases, Oct. 2013, pp. 1-50.

"ETSI GS NFV 002 V1.2.1", Network Functions Virtualisation (NFV); Architectural Framework, Dec. 2014, pp. 1-21.

"ETSI GS NFV-IFA006 v0.9.0", Network Function Virtualisation (NFV); Management and Orchestration; Vi-Vnfm Reference Point—Interface and Information Model Specification, Jan. 2016, pp. 1-113.

"ETSI GS NFV-MAN 001 V1.1.1", Network Functions Virtualisation (NFV); Management and Orchestration, Dec. 2014, pp. 1-184.

"GS NFV-IFA 007 v0.5.0", Network Function Virtualization (NFV); Management and Orchestration; Or-Vnfm reference point—Interface and Information Model Specification, Dec. 2015, pp. 1-60.

"GS NFV-IFA005 V0.11.1", Network Functions Visualisation (NFV); Management and Orchestration; Or-Vi reference point—Interface and Information Model Specification, Feb. 2016, pp. 1-170.

\* cited by examiner

MANAGING PLANNED ADJUSTMENT OF ALLOCATION OF RESOURCES IN A VIRTUALISED NETWORK

TECHNICAL FIELD

The present invention relates to methods for managing resources in a Network Function Virtualisation Infrastructure, to corresponding Allocation Elements, to corresponding Elements for orchestrating virtual resources to provide a network service, and to corresponding computer programs, computer program products, and systems for Network Function Virtualisation Management and Orchestration.

BACKGROUND

Conventional system architectures require all applications to execute their software on dedicated, vendor specific hardware platforms. This native deployment model is now gradually being replaced with a Network Functions Virtualisation (NFV) model. NFV makes use of standard IT virtualisation technology to consolidate many network equipment types onto industry standard high volume servers, switches and storage. This uniform and scalable hardware may be located in Data Centres, Network Nodes and/or in end user premises. A virtualised deployment model offers numerous advantages over a native deployment model, including reduction of operational and capital expense (OPEX and CAPEX). No longer being locked in to application specific hardware, telecoms operators are able to use commercial off-the-shelf (COTS) hardware and make economies of scale. In addition, owing to the significant reduction in the variety infrastructure equipment, management activities are simplified, no longer requiring specialist operators for multiple different platforms. Reduction of Time to Market (TTM) is another significant advantage offered by a virtualised deployment model. Installation of new hardware equipment is very time consuming, involving a variety of different parties within the operator domain, the regulatory domain and the supplier domain. This delay imposed by the installation of new hardware can impede the fast reaction to market needs that is desirable for business success. In addition, market success of new features and solutions is highly unpredictable and it is therefore difficult to deploy the right processing, networking and storage capacity for individual network functions at the right time. Virtualisation allows for the fast reallocation of processing, networking and storage capacity to those network functions that need it.

A Network Functions Virtualisation Industry Specification Group (NFV ISG) has been created under the auspices of the European Telecommunications Standards Institute (ETSI) to create a framework and define architecture and interfaces for NFV. Two of the principle standardisation documents produced by the NFV ISG are: "Network Functions Virtualisation (NFV); Architectural Framework", ETSI GS NFV 002 V1.2.1 (2014-12) and "Network Functions Virtualisation (NFV); Management and Orchestration", ETSI GS NFV-MAN 001 V1.1.1 (2014-12), elements of which are introduced below. In non-virtualised deployments, Network Functions (NFs) are implemented as a combination of vendor specific software and hardware, often referred to as network nodes or network elements. NFV introduces a number of differences in the way network service provisioning is realised, which differences may be summarised as follows:

Decoupling software from hardware: as the network element is no longer a collection of integrated hardware and software entities, the evolution of both hardware and software may take place independently.

Flexible network function deployment: the detachment of software from hardware enables sharing and reassignment of infrastructure resources. Assuming that the pool of hardware or physical resources is already in place and installed at some NFVI Point of Presence (PoP), network function software instantiation may be substantially automated, making use of different cloud and network technologies which may be currently available, and significantly increasing the speed with which new network services may be deployed over the same physical platform.

Dynamic operation: the decoupling of the functionality of the network function into instantiable software components provides greater flexibility to scale the actual Virtualised Network Function (VNF) performance in a dynamic way and with fine granularity, for example according to the actual traffic for which the network operator needs to provision capacity.

Network Functions Virtualisation envisages the implementation of Network Functions (NFs) as software-only entities that run over the NFV Infrastructure (NFVI). FIG. 1 illustrates the high-level NFV framework, and is a zoomed out and simplified version of the reference architectural framework of FIG. 2, which is reproduced from the above mentioned "Network Functions Virtualisation (NFV); Architectural Framework", ETSI GS NFV 002 V1.2.1 (2014-12) standardisation document. Referring to FIG. 1, three main working domains are identified in NFV:

Virtualised Network Functions, which are the software implementation of one or more network functions which are capable of running over the NFVI;

NFV Infrastructure (NFVI), which includes the range of physical resources and their virtualisation, and supports the execution of the VNFs and NFV Management and Orchestration, which covers the orchestration and lifecycle management of physical and/or software resources that support the infrastructure virtualisation, and the lifecycle management of VNFs; NFV Management and Orchestration focuses on all virtualisation-specific management tasks necessary in the NFV framework.

The NFV framework enables dynamic construction and management of VNF instances and the relationships between them regarding data, control, management, dependencies and other attributes. The NFV framework thus provides the capability to load, execute and move VNFs across different but standardised NFVI-PoP multivendor environments. The NFV architectural framework identifies functional blocks and the main reference points between these blocks. Some of the identified functional blocks are already present in current deployments, whilst others might be added to support the virtualisation process and consequent operation. Referring to the reference architectural framework of FIG. 2, the main functional blocks of the NFV architectural framework are:

Virtualised Network Function (VNF); Element Management (EM); NFV Infrastructure (NFVI), including Hardware and virtualised resources, and a Virtualisation Layer; Virtualised Infrastructure Manager(s) (VIMs); NFV Orchestrator (NFVO); VNF Manager(s) (VNFMs); Service, VNF and Infrastructure Description; and Operations and Business Support Systems (OSS/BSS).

In FIG. 2 the OSS/BSS is coupled to element managers EM1, EM2, EM3. Each element manager is coupled to manage one or more corresponding VNFs, VNF1, VNF2, VNF3. The VNFs each use virtual and physical resources of the NFVI via a Vn-Nf interface. The main blocks of the NFVI shown are Virtual Computing, Virtual Storage, Virtual Network, a Virtualisation layer which couples these virtual entities to corresponding hardware resources in the form of Computing Hardware, Storage Hardware and Network Hardware.

The key reference points, or interfaces, between the above mentioned functional blocks are illustrated in FIG. 2, and include the Vi-Vnfm interface, between the one or more VNFMs and the VIM(s), the Nf-Vi interface, between the NFVI and the VIM(s), and the Ve-Vnfm interface, between the one or more VNFMs and the Virtualised Network Functions. The Ve-Vnfm interface may comprise dedicated interfaces to the VNFs themselves (Ve-Vnfm-vnf) and dedicated interfaces to the VNF EM(s) (Ve-Vnfmem).

The key functional blocks and reference points are also illustrated in FIG. 3, which shows a multi-NFVI architecture with a common management system. The following glossary provides a definition of the key functional blocks introduced above and illustrated in FIGS. 2 and 3, together with related terms employed in the present specification.

Hypervisor: A hypervisor is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Multiple instances of a variety of operating systems may share the virtualised hardware resources.

Virtual Machine (VM): a virtualised computation environment which behaves very much like a physical computer/server.

Virtualisation Container: a partition of a compute node that provides an isolated virtualised computation environment, for example a virtual machine.

Virtualised Network Function (VNF): an implementation of an executable software program that constitutes the whole or a part of a Network Function and can be deployed on a virtualisation infrastructure.

Virtualised Network Function Component (VNFC): a component of a VNF which provides a subset of the VNF functionality; a single VNF may comprise multiple VNFCs.

Virtualised Network Function Component Instance (VNFC Instance): an instance of a VNFC, which is hosted by a dedicated Virtualisation Container VNF Instance (VNFI): a run-time instantiation of a VNF resulting from completing the instantiation of the VNF using the VNF deployment and operational information captured in the VNF Description, as well as additional run-time instance-specific information and constraints.

Element Manager (EM): an element management system that performs fault, configuration, accounting, performance and security management.

Virtualised Infrastructure Manager (VIM): comprises the functionalities that are used to control and manage the interaction of a VNF with computing, storage and network resources provided by a NFVI-PoP under its authority, as well as their virtualisation.

VNF Manager (VNFM): responsible for VNF lifecycle management including for example instantiation, update, query, scaling and termination. Multiple VNFMs may be deployed, with some VNFs having a dedicated VNFM, while other multiple VNFs may be managed by a single VNFM.

NFV Orchestrator (NFVO): an element that conducts the orchestration and management of NFV infrastructure and software resources, and is responsible for realising network services on NFVI.

Network Function Virtualisation Infrastructure (NFVI): delivered across multiple NFVI Nodes, referred to as Point of Presence (PoP). NFVI-PoPs may be geographically separated and a single NFVI may comprise NFVI-PoPs from different vendors.

Network Controller (NC), an abstraction layer below the VIM for a given NFVI-PoP.

Network Service (NS): describes the relationship between VNFs and possibly Physical Network Functions PNFs that it contains and the links needed to connect VNFs that are implemented in the NFVI network. Links are also used to interconnect the VNFs to PNFs and endpoints. Endpoints provide an interface to the existing network, including the possibility of incorporating PNFs to facilitate evolution of the network.

Portability: refers to the flexibility to move VNFs between different NFVI-PoPs. References to virtual resources are intended to encompass any of the virtual entities described above, including VNFC, VNFCI, Virtualisation Container, VM, or virtualised hardware such as virtual storage, virtual processor and virtual network.

As discussed above, NFV adds new capabilities to communications networks, and requires a new set of management and orchestration functions to be added to the current model of operations, administration, maintenance and provisioning. These functions are specified in the above mentioned "Network Functions Virtualisation (NFV); Management and Orchestration", ETSI GS NFV-MAN 001 V1.1.1 (2014-12) standardisation document.

In the example multi NFVI architecture shown in FIG. 3, the NFV1 has two PoPs (PoP1 and PoP2) coupled by a WAN, and has a common management system. This should be able to load, execute and move VNFs across different PoPs from different vendors for example. There are shown a number of Network Controllers for each PoP, and a Network Controller for the WAN. The common management system has a VNFM coupled to the various network controllers via a VIM for each PoP, and via a WAN infrastructure manager element. There is an NFVO coupled to the VNFM and coupled to the VIMs and to the WAN infrastructure manager element. The interfaces between elements correspond to those described above for FIG. 2. Also shown in FIG. 3 is an example of a VNF forwarding graph, extending between a PNF (Physical Network Function) Endpoint 1 located outside the NFVI and a PNF Endpoint 2 located in PoP2. The forwarding graph passes from the PNF Endpoint 1 via the WAN to VNF1 in PoP1, then via the WAN again to VNF2 in PoP2, and then via component DC-2, to PNF Endpoint 2.

Allocation of physical resources in the NFVI is a particularly important and potentially complex task covered by the management and orchestration functions. Many different requirements and constraints may need to be satisfied concurrently in the allocation of resources. Allocation and release of resources is thus a dynamic process, performed in response to consumption of those resources by other functions. Resource allocations and releases may be needed throughout the lifetime of any given VNF, although the management and orchestration functions are unaware of allocations for individual VNFs. This means adjustments in allocations can cause problems in operation and management of the VNFs.

SUMMARY

Embodiments of the invention provide improved methods and apparatus. According to a first aspect of the invention, there is provided a method, performed in a Network Functions Virtualisation Management and Orchestration system, NFV-MANO, for managing resources in a Network Function Virtualisation Infrastructure, NFVI, to provide network services, the NFV-MANO having elements (NFVO, VNFM) for orchestrating and managing virtual resources to provide a network service and having an allocation element (VIM) for managing an allocation of physical resources for the virtual resources. The method has steps, performed by at least one of the elements for orchestrating and managing, of obtaining information about which of the virtual resources could be affected by a planned adjustment of the allocation, and determining an impact of the planned adjustment on a network service, based on the information about which of the virtual resources could be affected. An indication based on the impact on the network service is sent to the allocation element.

Any additional features can optionally be added, and some are described below and set out in dependent claims. One such additional feature is a step of assessing an acceptability of the impact, based on the determination of the impact, and the step of sending the indication based on the impact comprises sending an indication of the acceptability of the impact. Another such additional feature is receiving an indication of a priority level of the planned adjustment of the allocation, and the step of sending the indication based on the impact is carried out based on the priority level. The indication of priority level of the planned allocation adjustment can indicate one or more of: mandatory without delay, mandatory with planned delay, recommended, recommended with planned delay, and optional.

Another such additional feature is a step of determining whether to adapt the network service to compensate for the planned adjustment of the allocation according to the determination of the impact on the network service and according to the indication of priority level. Another such additional feature is the step of sending the indication based on the impact comprises sending a request to proceed with the planned allocation adjustment after a requested delay. Another such additional feature is the at least one of the elements for orchestrating and managing comprises a Network Function Virtualisation Orchestrator NFVO and the steps of the method are carried out by the NFVO. The NFV-MANO can have a Virtual Network Function Manager, VNFM, and the step of obtaining the information about which of the virtual resources could be affected can comprise receiving from the VNFM the information about which of the virtual resources could be affected.

Another such additional feature is the one of the elements for orchestrating and managing comprises a Virtual Network Function Manager, VNFM, and the step of obtaining the information about which of the virtual resources could be affected comprises a step of generating this information, carried out by the VNFM. In this case the step of determining the impact comprises the VNFM sending to another element of the NFV-MANO, information about which of the virtual resources could be affected and causing the another element to provide the determination of the impact to the VNFM, and the step of sending the indication based on the impact comprises the VNFM sending the indication to the allocation element. Another such additional feature is the allocation element comprising a Virtual Infrastructure Manager VIM and the step of sending the indication based on the impact comprising sending the indication to the VIM.

Another aspect of the invention provides a method, performed in a Network Function Virtualisation Management and Orchestration system NFV-MANO, for managing resources in a Network Functions Virtualisation Infrastructure NFVI, the NFV-MANO having elements (NFVO, VNFM) for orchestrating and managing virtual resources to provide a network service and having an allocation element (VIM) for managing an allocation of physical resources for the virtual resources. The method has steps, performed by the allocation element, of sending to a respective one of the elements for orchestrating and managing, information about a planned adjustment of the allocation, to cause the respective one of the elements to obtain information about which of the virtual resources could be affected by the planned adjustment, and to determine an impact on a network service of the planned adjustment, based on the information about which of the virtual resources could be affected by the planned adjustment. There are also steps of receiving from the respective one of the elements, an indication based on the impact on the network service, and implementing the planned allocation adjustment according to the indication based on the impact on the network service.

Any additional features can optionally be added to this aspect, and some are described below and set out in dependent claims. One such additional feature is the step of sending the information about the planned adjustment of the allocation comprises sending an indication of a priority level of the planned adjustment of the allocation. Another such additional feature is the indication of priority level of the planned allocation adjustment indicates at least one of: mandatory without delay, mandatory with planned delay, recommended, recommended with planned delay, and optional. Another such additional feature is the step of receiving the indication based on the impact comprises receiving a request to proceed with the planned allocation adjustment after a requested delay, and the step of implementing is carried out after the requested delay.

Another such additional feature is the respective one of the elements for orchestrating and managing comprises a Network Function Virtualisation Orchestrator NFVO and the step of receiving the indication based on the impact comprises receiving this indication from the NFVO. Another such feature is that the allocation element comprises a Virtual Infrastructure Manager, VIM, and the steps of sending the information about the planned adjustment, receiving the indication based on the impact and implementing the planned adjustment of the allocation, are carried out by the VIM. Another such additional feature is that the respective one of the elements for orchestrating and managing comprises a Virtual Network Function Manager, VNFM, and the step of sending the information about the planned adjustment comprises sending the information to the VNFM to cause it to obtain the information about which of the virtual resources could be affected. Another such additional feature is the step of implementing comprising any one of: overriding an unfavourable indication based on the impact, amending the planned adjustment, and obtaining information about which of the virtual resources are more critical to the impact than others of the virtual resources.

Another aspect provides computer program configured when run on a computer, to carry out a method according to any of the methods set out above. Another aspect provides a computer program product comprising computer readable media having stored thereon a computer program as set out above.

Another aspect provides an element of a Network Functions Virtualisation Management and Orchestration system NFV-MANO, the NFV-MANO being configured for managing resources in a Network Function Virtualisation Infrastructure, NFVI, to provide network services, the element being one of a plurality of elements for orchestrating and managing (NFVO, VNFM) virtual resources to provide a network service, in cooperation with an allocation element (VIM) configured for managing an allocation of physical resources for the virtual resources. The one of the elements for orchestrating and managing comprising a processor and a memory, the memory containing instructions executable by the processor such that the one of the elements is operable to obtain information about which of the virtual resources could be affected by a planned adjustment of the allocation, and determine an impact on a network service, based on the information about which of the virtual resources could be affected by the planned adjustment of the allocation. An indication based on the impact on the network service is sent to the allocation element VIM.

Any additional features can optionally be added to this aspect, and some correspond to the method features set out above and described below and set out in dependent claims. One such additional features is that the element is further operable to assess an acceptability of the impact, based on the determination of the impact, and to send to the allocation element an indication of the acceptability of the impact. Another such additional feature is that the element is further operable to receive an indication of a priority level of the planned adjustment of the allocation, and the element is further operable to send the indication based on the impact according to the indicated priority level. Another such additional feature is that the indication of priority level of the planned adjustment of the allocation received by the element, indicates at least one of: mandatory without delay, mandatory with planned delay, recommended, recommended with planned delay, and optional. Another such additional feature is that the element is further operable to determine whether to adapt the network service to compensate for the planned adjustment of the allocation according to the determination of the impact on the network service and according to the indication of priority level.

Another such additional feature is that the element is further operable to send the indication based on the impact with a request to proceed with the planned allocation adjustment after a requested delay. Another such additional feature is that the element comprises a Network Function Virtualisation Orchestrator NFVO. Another such additional feature is that the NFV-MANO also has a Virtual Network Function Manager, VNFM and the NFVO is configured to obtain the information about which of the virtual resources could be affected by receiving from the VNFM the information about which of the virtual resources could be affected. Another such additional feature is that the element comprises a Virtual Network Function Manager, VNFM, operable to obtain the information about which of the virtual resources are affected by the planned allocation adjustment and operable to determine the impact by sending a request to the NVFO to provide an indication based on the impact based on the information about which of the virtual resources could be affected by the planned adjustment of the allocation, for the VNFM to send to the allocation element. Another such additional feature is that the NFV-MANO comprises a Virtual Infrastructure Manager VIM and the element is further configured to send the indication based on the impact to the VIM.

Another aspect provides an allocation element for allocating in a Network Functions Virtualisation Management and Orchestration system NFV-MANO, the NFV-MANO being configured for managing resources in a Network Function Virtualisation Infrastructure, NFVI, to provide network services, the NFV-MANO also having elements for orchestrating and managing (NFVO, VNFM) virtual resources to provide a network service, in cooperation with the allocation element (VIM), the allocation element being configured for managing an allocation of physical resources for the virtual resources. The allocation element comprises a processor and a memory, the memory containing instructions executable by the processor such that the allocation element is operable to send to one of the elements for orchestrating and managing, information about a planned adjustment of the allocation, to cause the one of the elements to obtain information about which of the virtual resources could be affected by the planned adjustment, and to determine an impact on a network service of the planned adjustment, based on the information about which of the virtual resources could be affected by the planned adjustment. It is also operable to receive from the one of the elements, an indication based on the impact on the network service and to implement the planned allocation adjustment according to the indication based on the impact on the network service.

Any additional features can optionally be added to this aspect, and some correspond to the method features set out above and described below and set out in dependent claims. One such additional feature is the allocation element being further operable to receive the indication based on the impact as comprising an indication of the acceptability of the impact. Another such additional feature is that the allocation element is further operable to send the information about the planned adjustment of the allocation so as to have an indication of a priority level of the planned adjustment of the allocation. Another such additional feature is that the indication of priority level of the planned allocation adjustment indicates at least one of: mandatory without delay, mandatory with planned delay, recommended, recommended with planned delay, and optional.

Another such additional feature is that the allocation element is further operable to receive, with the indication based on the impact, a request to proceed with the planned allocation adjustment after a requested delay, and the allocation element is further operable to carry out the implementing after the requested delay. Another such additional feature is that the allocation element comprises a Virtual Infrastructure Manager VIM. Another such additional feature is that the one of the elements comprises a Virtual Network Function Manager, VNFM, and the allocation element is further operable to send the information about the planned allocation adjustment to the VNFM to cause the VNFM to obtain the information about which of the virtual resources could be affected by the planned adjustment. Another such additional feature is the allocation element being also operable to implement the planned allocation adjustment by any one of: overriding an unfavourable indication based on the impact, amending the planned adjustment, and obtaining information about which of the virtual resources are more critical to the impact than others of the virtual resources.

Another aspect provides a Network Functions Virtualisation Management and Orchestration system NFV-MANO, the NFV-MANO being configured for managing resources in a Network Function Virtualisation Infrastructure, NFVI, to provide network services, the NFV-MANO having element for orchestrating and managing (NFVO, VNFM) virtual resources to provide a network service, at least one of the elements for orchestrating and managing being as set out in above, and the NFV-MANO also having an allocation element (VIM) as set out above, configured for managing an allocation of physical resources for the virtual resources.

Another aspect provides an element of a Network Functions Virtualisation Management and Orchestration system NFV-MANO, the NFV-MANO being configured for managing resources in a Network Function Virtualisation Infrastructure, NFVI, to provide network services, the element being one of a plurality of elements for orchestrating and managing (NFVO, VNFM) virtual resources to provide a network service, in cooperation with an allocation element (VIM) configured for managing an allocation of physical resources for the virtual resources. The one of the elements for orchestrating and managing comprises a virtual resource information unit for obtaining information about which of the virtual resources could be affected by a planned adjustment of the allocation, and an impact determination unit for determining an impact on a network service, based on the information about which of the virtual resources could be affected by the planned adjustment of the allocation, and an indication unit for sending to the allocation element an indication based on the impact on the network service.

Another aspect provides an allocation element for allocating in a Network Functions Virtualisation Management and Orchestration system NFV-MANO, the NFV-MANO being configured for managing resources in a Network Function Virtualisation Infrastructure, NFVI, to provide network services, the NFV-MANO also having elements for orchestrating and managing (NFVO, VNFM) virtual resources to provide a network service, in cooperation with the allocation element (VIM), the allocation element being configured for managing an allocation of physical resources for the virtual resources. The allocation element comprises a planning unit for sending to one of the elements for orchestrating and managing, information about a planned adjustment of the allocation, to cause the one of the elements to obtain information about which of the virtual resources could be affected by the planned adjustment, and to determine an impact on a network service of the planned adjustment, based on the information about which of the virtual resources could be affected by the planned adjustment, a receive unit for receiving from the one of the elements, an indication based on the impact on the network service and an implementation unit for implementing the planned allocation adjustment according to the indication based on the impact on the network service.

Any of the additional features can be combined together and combined with any of the aspects. Other effects and consequences will be apparent to those skilled in the art, especially over compared to other prior art. Numerous variations and modifications can be made without departing from the claims of the present invention.

BRIEF DESCRIPTION OF THE DRAWINGS

How the present invention may be put into effect will now be described by way of example with reference to the appended drawings, in which.

DETAILED DESCRIPTION

Figure 1:
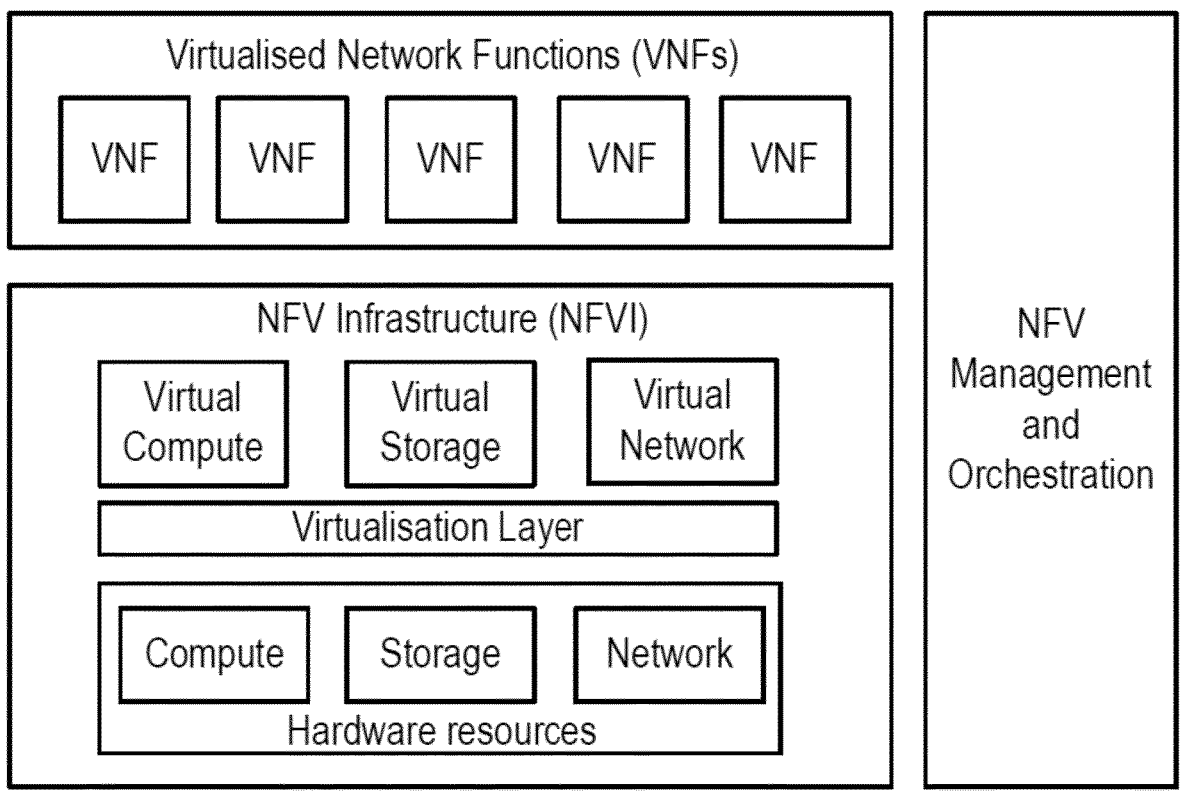
FIGS. 1 to 5 show conventional arrangements.

The present invention will be described with respect to particular embodiments and with reference to certain drawings but the scope of the invention is not limited thereto. The drawings described are only schematic and are non-limiting. In the drawings, the size of some of the elements may be exaggerated and not drawn to scale for illustrative purposes.

Definitions

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

Abbreviations

ASIC Application Specific Integrated Circuit
EM Element Management
FPGA Field Programmable Gate Array
ISP In Service Performance
NF Network Function
NFV Network Functions Virtualisation
NFVI Network Functions Virtualisation Infrastructure
NFV-MANO NFV Management and Orchestration
NFVO Network Functions Virtualisation Orchestrator
NSD Network Service Descriptor
PNF Physical Network Function
PoP Point of Presence
VIM Virtual Infrastructure Manager
VM Virtual Machine
VNF Virtualised Network Function
VNFC Virtual Network Function Component
VNFM VNF Manager
Introduction By way of introduction to the embodiments, some issues with conventional arrangements will be explained. An end-to-end network service (e.g. mobile voice/data, Internet access, a virtual private network) can be described by an NF Forwarding Graph of interconnected NFs and end points, and an example was described above in relation to FIG. 3. A network service can be viewed architecturally as a forwarding graph of NFs interconnected by supporting network infrastructure. These network functions can be implemented in a single operator network or interwork between different operator networks. The underlying network function behavior contributes to the behavior of the higher-level service. Hence, the network service behavior is a combination of the behavior of its constituent functional blocks, which can include individual NFs, NF Sets, NF Forwarding Graphs, and/or the infrastructure network.

Figure 4:
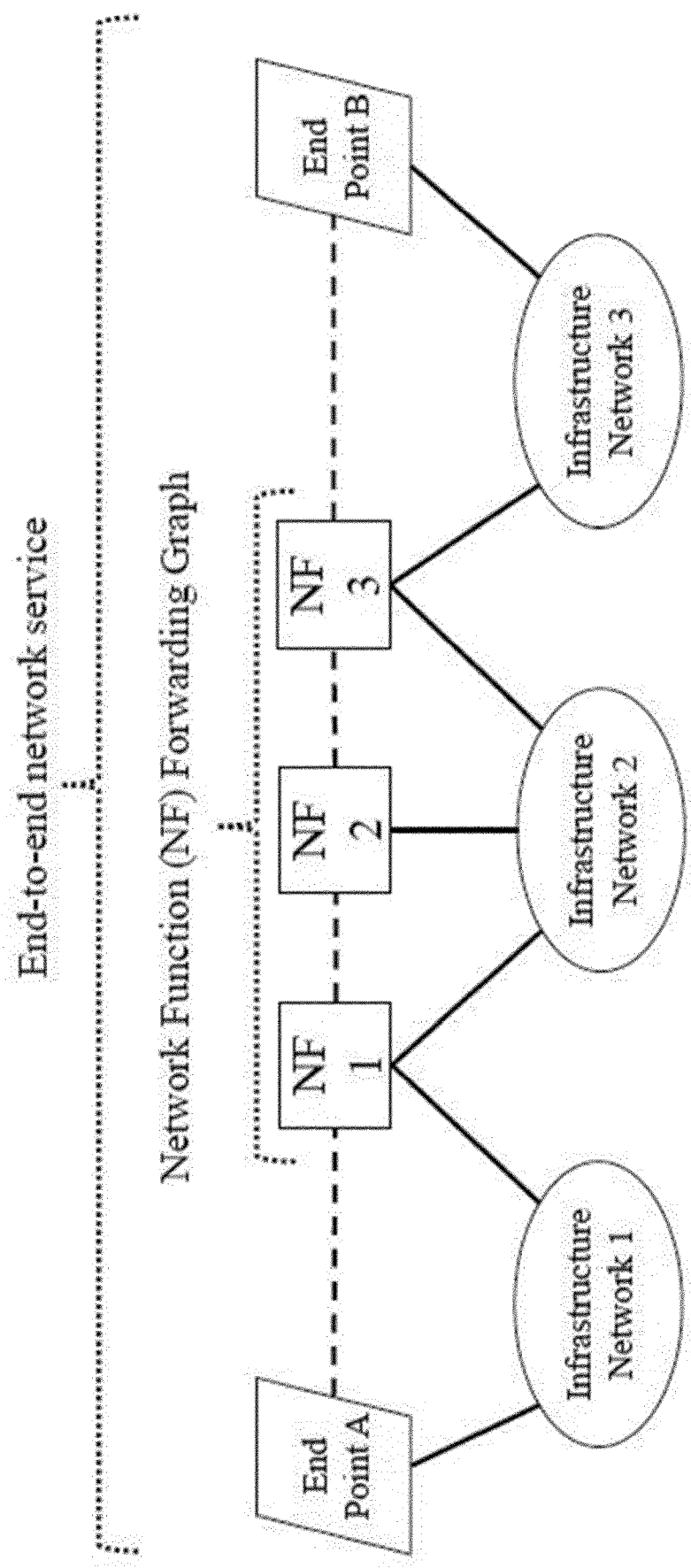

FIG. 4 shows an example of a forwarding graph, showing a representation of an end-to-end network service that includes a nested NF Forwarding Graph as indicated by the network function block nodes in the middle of the figure interconnected by logical links. The end points are connected to network functions via network infrastructure (wired or wireless), resulting in a logical interface between the end point and a network function. These logical interfaces are represented in the figure with dotted lines. In FIG. 4, the outer end-to-end network service is made up of End Point A, the inner NF Forwarding Graph, and End Point B, while the inner NF Forwarding Graph is composed of network functions NF1, NF2 and NF3. These are interconnected via logical links provided by the Infrastructure Network 2.

Figure 5:
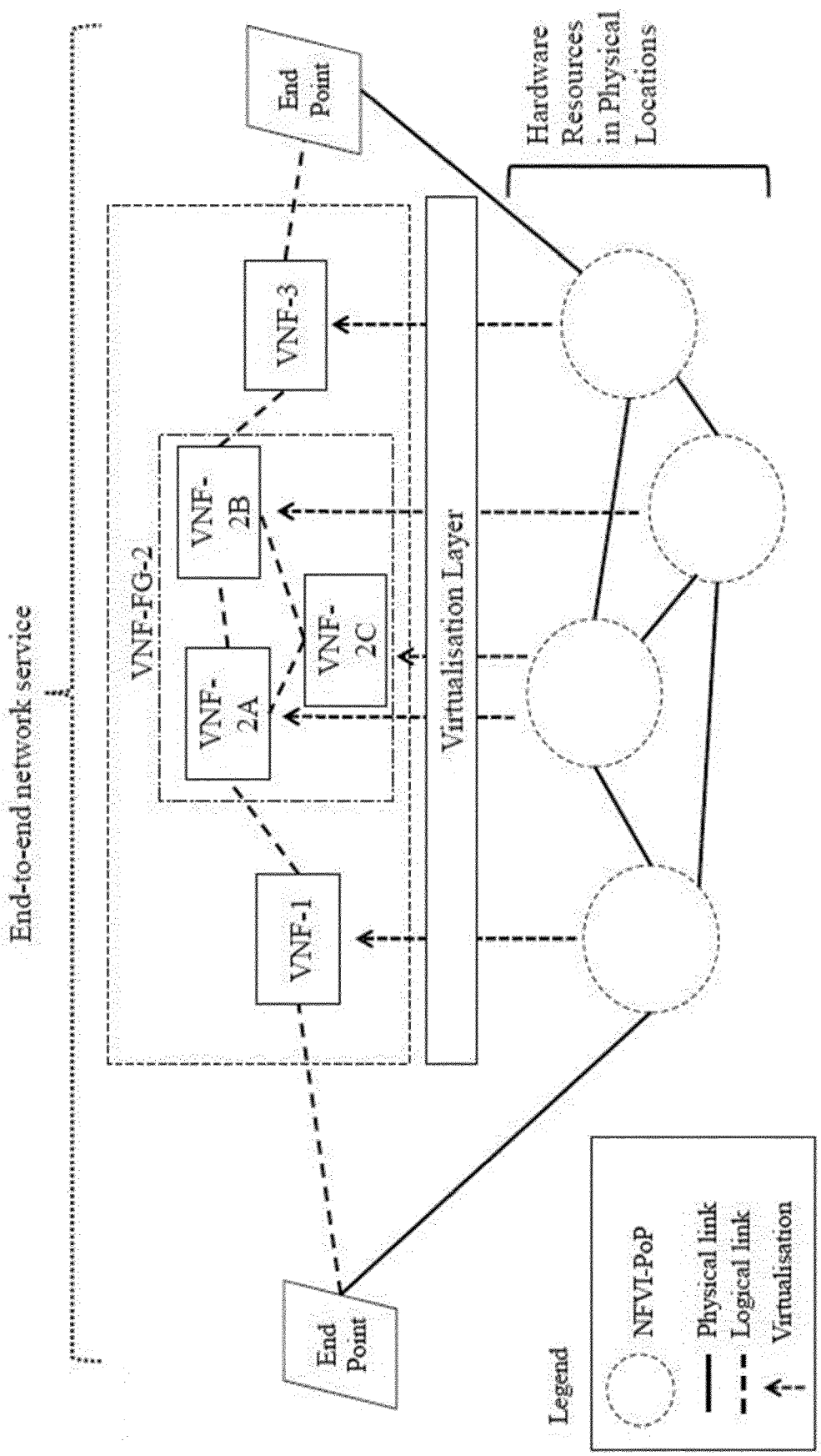

FIG. 5 shows another example of an end-to-end network service and also shows some of the different layers that are involved in its virtualisation process. In this example, an end-to-end network service can be composed of only VNFs (VNF-1, VNF-2A, VNF-2B, VNF-2C, VNF-3 and two endpoints. The decoupling of hardware and software in network functions virtualisation is realized by a virtualisation layer. This layer abstracts hardware resources of the NFV Infrastructure. These hardware resources are shown as four interconnected PoPs, each hosting one or more of the VNFs, via the virtualisation layer.

Figure 3:
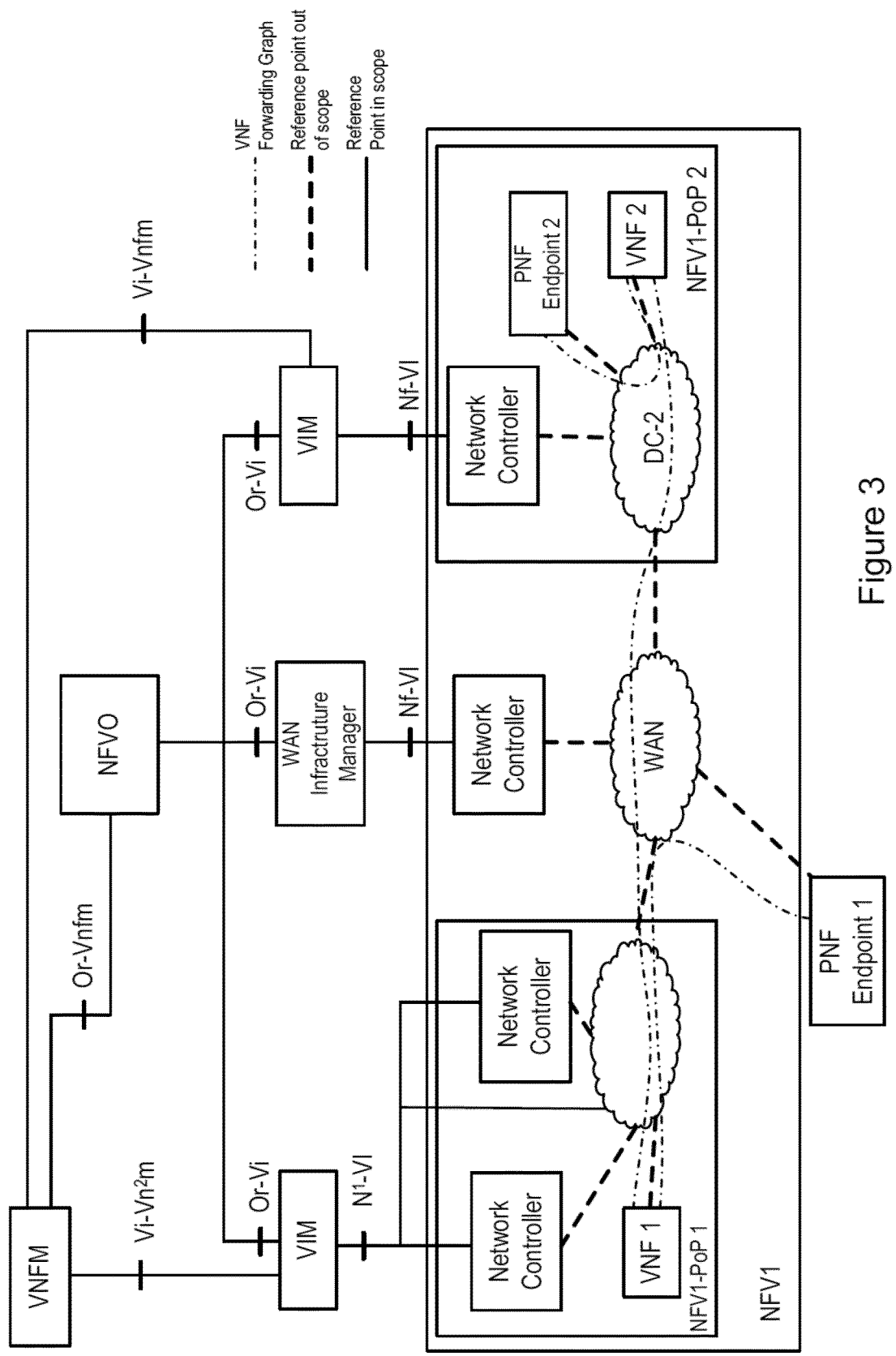

An infrastructure domain administered by a NFVO may consist of multiple NFVI-PoPs, as shown in FIGS. 3 and 5 for example. Different kinds of adjustment of allocation of resources may therefore be performed: The NFVO may decide to migrate VNFs between different NFVI-PoPs. VNF instance migration is not yet described by ETSI, but it may be assumed that inter-NFVI-PoP migration will require awareness and coordination by NFVO. A VIM may decide to reallocate or change properties of resources assigned to VNFC instances. Reallocation of computing hosts to a VNFC instance is also referred to as "Virtualisation Container migration", with a "Migrate Virtualisation Container" operation supported on the Nf-Vi interface. Under current specifications, both the VNFM and NFVO remain unaware of any resource reallocation that the VIM initiates. Either as a consequence of Virtualisation Container migration, or independently of any such migration, the properties of memory and CPU that are allocated to a Virtualisation Container may change, in procedures which may be triggered by automated supervision functions or by administrative intervention. References to reallocation can encompass any kind of adjustment of the allocation, including for example initial allocation, final release, creating, or moving or removing a virtual resource, or adding, removing or changing a physical resource.

Resource reallocation operations may be configured or triggered by a data centre operator, and should not require handshaking with any tenant operator or administrator. Some of the prominent motivations for such operations are:
  Performing maintenance on NFVI components: planned maintenance activities include upgrade of software and hardware components and may also include change or modification of policies and rules that a VIM uses for resource allocation.
  Performing troubleshooting on NFVI components: this may include restart or other kinds of recovery actions on NFVI components, but may also comprise resource consuming observational activities such as logging and tracing.
  Optimising workload distribution within the data centre: reallocation of resources, primarily computing hosts, to individual VNFC instances may be indicated by resource utilization measurement results.
  Optimising power consumption: resource utilisation may vary greatly according to time of the day, day of the week or in as a consequence of special events or occasions. At times of low demand, VNFC instances may be moved away from a number of computing hosts to allow them to be powered down. This can be a manually triggered or automated activity.

A VNF is deployed on a single NFVI-PoP, which is controlled by a dedicated VIM. Both VNFM and NFVO are aware of which VIM coordinates the resources for a particular VNF. VNFM and NFVO are however unaware of the particular correlation between VNFC instances and individual resources that have been assigned to them by a VIM. Allocation of individual NFVI resources within a PoP is of temporary nature and can in principle change at any time, as long as service level agreement with the tenant is satisfied. The current version of ETSI NFV-MANO use case descriptions do not explicitly cover operations related to location-internal re-allocation of NFVI resources to VNFC instances. However, related operations are described on the NFVI hypervisor management interface towards VIM, and a note states that these interfaces may be consumed by authenticated and authorised other parties.

One of the principles of virtualised data centres is that tenants should not become aware of resource reallocation, and reallocation procedures should not result in any ISP degradation. For example, when a live migration of a Virtualisation Container between computing hosts is performed, the VNF and related management systems are not notified and no effects should be experienced by the VNF. In real deployments, this principle is often not respected, as reallocation operations do have an impact on system performance, including for example the disconnection of telephone calls or interruption of network services. This is especially true for application architectures that do not perform load sharing between VNFs, are stateful and/or do not allow Virtualisation Container live migration.

If redundancy is not operative at the time of the event, then ISP impacts can be more severe compared to a scenario in which redundant components or information can be used to alleviate or compensate for the effects of resource reallocation. Detection of such conditions requires VNF specific knowledge and information, which is not available to the data centre administration domain. Some effects of resource reallocation can be alleviated if the VNF application architecture follows certain principles and guidelines. However, many applications that are deployed in virtualised data centres have originally been designed for deployment in a native environment, and conversion of the application architecture to respect virtualisation guidelines and principles may be uneconomical or technically non feasible.

Data centre operators have no knowledge about application specific requirement beyond a generic SLA, and coordination across operational domains is difficult and undesirable, if not impossible in certain instances. It is not therefore possible for the data centre to follow VNF specific procedures when performing resource reallocation in order to mitigate the effects of the reallocation operation.

Network Service

In the example described in relation to FIG. 3, the Resource Orchestration function of the NFVO is responsible for the following aspects related to NFVI connectivity services:

Global view of the network characteristics of the various logical links.

Orchestrate the VNFs required for a NS in a manner best suited to match the network constraints specified by the Network Service Descriptor (NSD)

Orchestrate connectivity over a combination of PNFs and VNFs.

Among the information used to accomplish the task, the vnf_dependency field in the NSD describes dependencies between VNF. Defined in terms of source and target VNF i.e. target VNF "depends on" source VNF. In other words a source VNF shall exist and connect to the service before target VNF can be initiated/deployed and connected. This element would be used, for example, to define the sequence in which various numbered network nodes and links within a VNF FG should be instantiated by the NFV Orchestrator.

Ideally, users of virtualised resources should not become aware of re-allocation of the underlying physical resource. Such procedures should not result in any performance or availability degradation. Following this assumption, there is no handshake between user and provider of a virtualised resource before, during or after such operations. For example, when a live migration of a Virtualisation Container between compute hosts is performed, the VNF and related management systems are not notified. In contrast to this ambition, such operations do have impact on system performance in real deployments. For example telephone calls may become disconnected or service interruption may occur. This is especially true for application architectures that do not perform load sharing between VNFs, are stateful and do not allow Virtualisation Container live migration. If redundancy is not operative at the time of the reallocation, then ISP impacts can be more severe compared to a scenario where redundant components or information can be used to alleviate or compensate the effects of the reallocation. Detection of such conditions requires VNF specific knowledge and information, which is not available to the data center administration domain.

Figure 6:
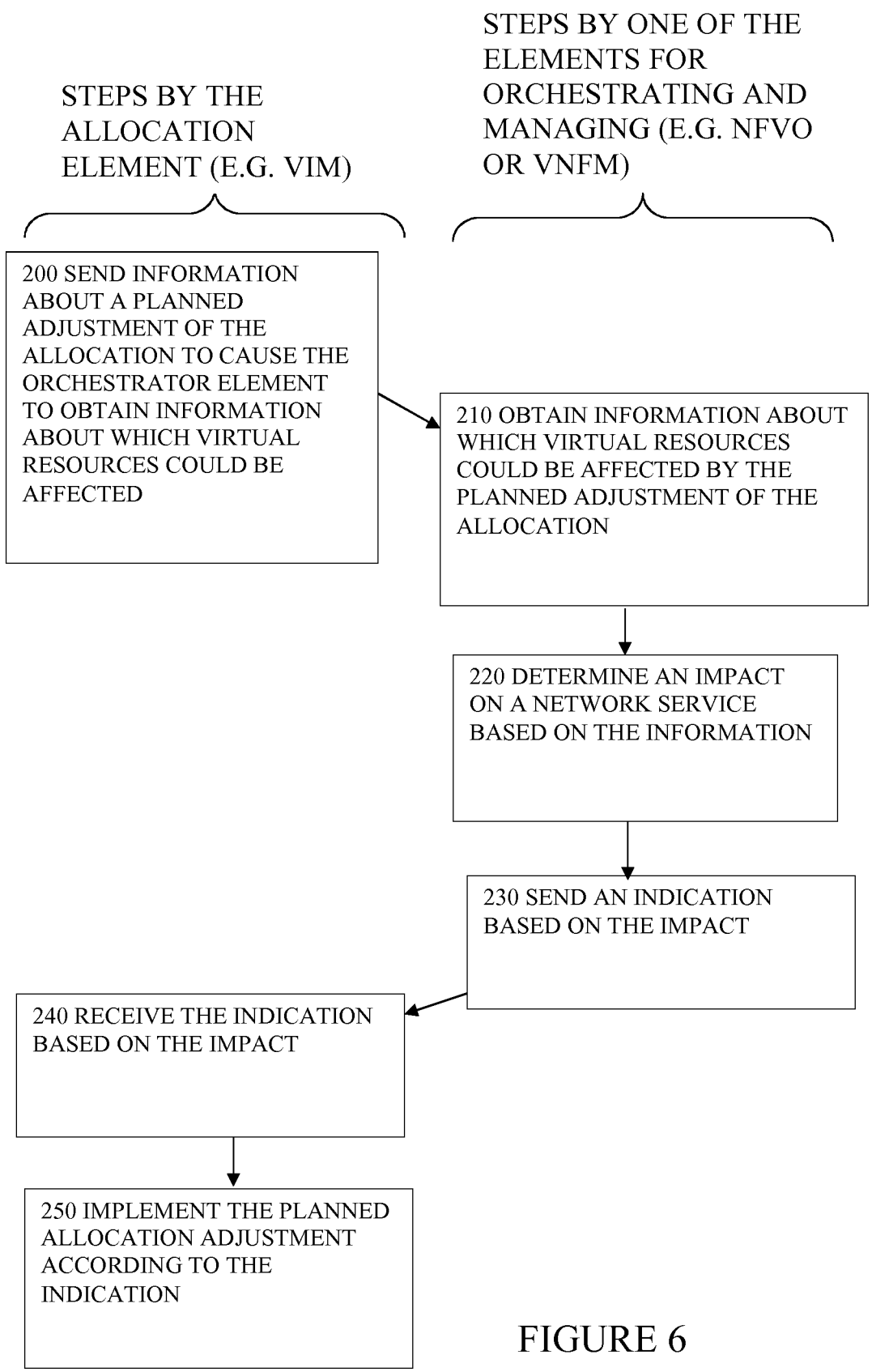
FIGS. 6 to 13 show steps of methods according to embodiments.

FIG. 6, Embodiment Showing Dependence on Impact on Network Service

FIG. 6 shows steps of an example of a method, performed in a Network Functions Virtualisation Management and Operations system, NFV-MANO, for managing resources in a Network Function Virtualisation Infrastructure, NFVI, to provide network services. In a right-hand column, are some of the actions of one of the elements (e.g. NFVO, VNFM) of the NFV-MANO for orchestrating and managing. This element can be any element involved in orchestrating at the network service level or managing at the VNF level, for example. For the examples in which this element is the NFVO, the steps shown can be new steps in addition to the usual functions of the NFVO in orchestrating virtual resources at the network level, to provide a network service. For the examples in which this element for orchestrating is the VNFM, the steps shown can be new steps in addition to the usual functions of the VNFM in managing VNFs. In the left-hand column are some of the actions of an allocation element (e.g. VIM) of the NFV-MANO for managing an allocation of physical resources for the virtual resources.

The steps performed by the one of the elements for orchestrating and managing (e.g. NFVO, VNFM), include obtaining 210 information about which of the virtual resources could be affected by a planned adjustment of the allocation. Following this is are steps of determining an impact 220 of the planned adjustment on a network service, based on the information about which of the virtual resources could be affected, and sending 230 to the allocation element (VIM), an indication based on the impact on the network service. The determination of impact can for example encompass determining whether the service will be temporarily unavailable, partly or completely unavailable, suffer increased latency and so on, depending on the type of service. The determination of impact can encompass indirect determination in the sense of getting the determination made by another element, or cooperating with another element to obtain the impact. There might be different conditions leading to judge whether there will be network impacts or not e.g. the virtual resource to be relocated is a front end, therefore loss of connectivity, or causes traffic interruption therefore major NS impact. If the virtual resource to be relocated is a backend machine, therefore the capacity of the node may temporarily be impacted thus a minor NS impact. The indication based on the impact can include the type and seriousness of impact to be expected. The seriousness parameter can have multiple level indications, on which a decision can be taken by NFVO or other element, whether or not to accept or authorise the change can be based. If the NFVO makes compensating adaptations to the NS, then the indication to the allocation element may be based on the impact after the compensating adaptations.

The steps shown performed by the allocation element, can include sending 200 to the one of the elements for orchestrating and managing, information about a planned adjustment of the allocation, to cause the one of the elements for orchestrating and managing to obtain information about which of the virtual resources could be affected by the planned adjustment, and to determine an impact on a network service of the planned adjustment, as described above. Subsequently there are steps by the allocation element of receiving 240 from the one of the elements (NFVO, VNFM), the indication based on the impact on the network service, and implementing 250 the planned allocation adjustment according to the indication based on the impact on the network service.

Figure 20:
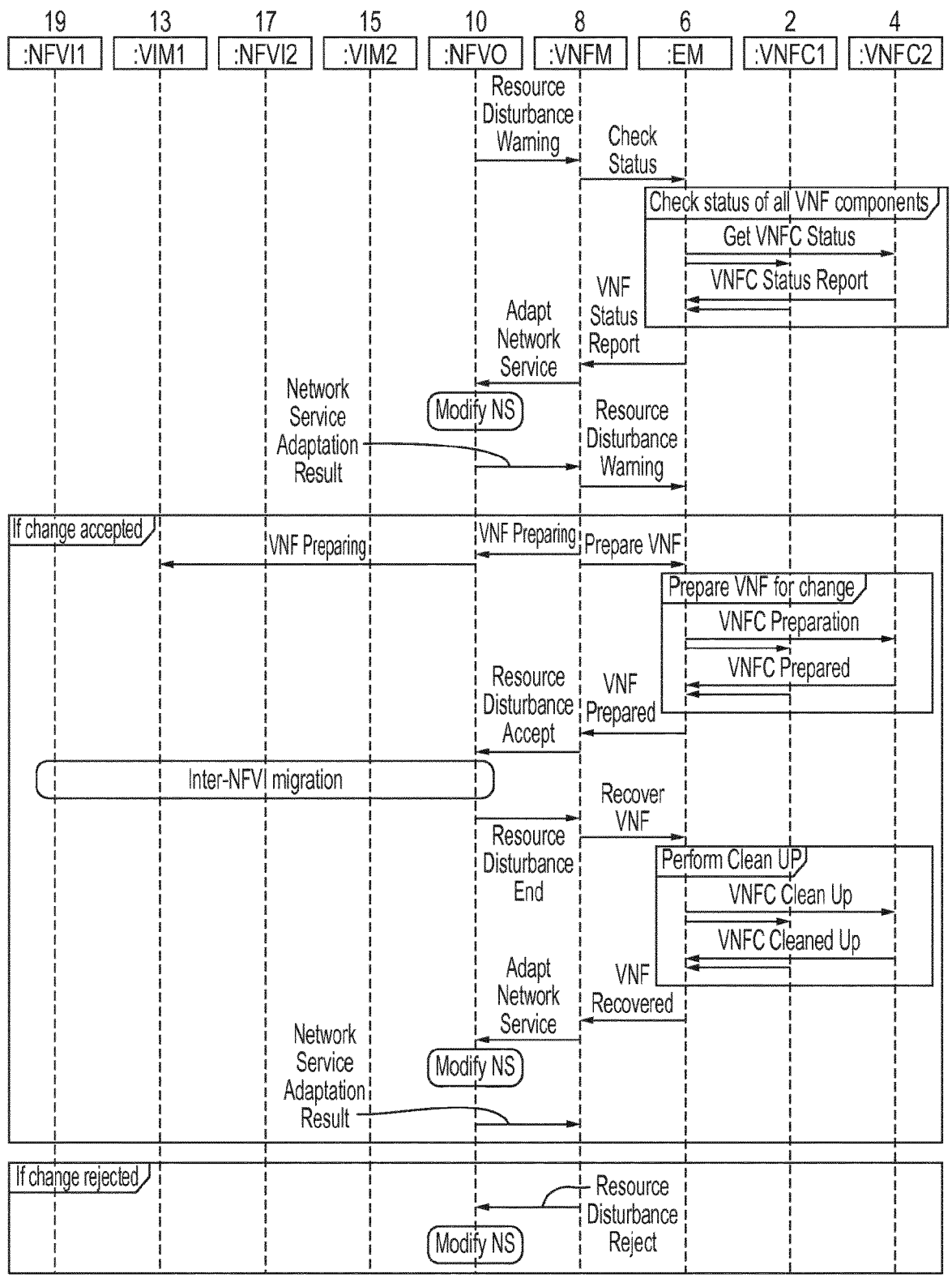

An effect of sending the indication based on the impact on network service is that it helps enable the allocation element to avoid more severe impacts and so overall quality of network service can be improved. Or, for a given level of network service quality, allocation management can be improved since the allocation management function can propose more adjustments or more radical adjustments knowing that it can get feedback of their impact, and so allocation can be improved for a given level of network service quality. Allocation adjustment is defined as including a reduction or increase or change in physical resources or moving or creating or removing virtual resource without changing physical resource. Thus it can be planned and implemented by the VIM or by the VIM and the VNFM. Or, in the case of moving a virtual resource to a different PoP, called inter PoP migration, it can be planned or initiated by other elements, such as the NVFO for example. FIG. 20 described below shows such an example where the NVFO is responsible for planning the adjustment and therefore the NVFO carries out the steps of the allocation element. In other examples the VNFM could initiate an inter PoP migration if it finds that insufficient physical resources are available at one PoP.

An effect of the above discussed example method, together with cooperating actions is to introduce a control mechanism such that planned resource allocation adjustments are performed in accordance with NFV requirements but also in such a manner as to avoid or minimise impact upon currently running operations. Delay and repeat timers may be introduced into the process flow in order to avoid deadlocks, and an overwrite mechanism may also be introduced, to ensure essential maintenance operations may be carried out, and to avoid endless loop cycles. The steps discussed above may be conducted via message flows over the interfaces Or-Vnfm and/or Vi-Vnfm, and/or Or-Vi for permission requests and responses, Ve-Vnfm (em/vnf) for the checking by a VNFM for which VNFs could be affected, and Nf-Vi and/or Or-Vi for the implementing of a planned resource allocation adjustment, following receipt of permission. In some examples, a condition may be attached to a granting of permission, so as to impose a delay before the adjustment is carried out. This may allow time for preparatory actions to be completed in the VNF. In the event of an imposed delay, a locking mechanism may be introduced to prevent any further operations on other Virtualisation Containers on which the affected VNF is running.

The allocation element or the elements for orchestrating and managing may not have direct visibility of individual VNFs, but may identify an appropriate VNFM by identifying a Virtualisation Container, such as a VM, which will be affected by the planned resource allocation adjustment, and then identifying the VNFM associated with the affected Virtualisation Container. The VNFM will have knowledge of which VNF is running on the affected Virtualisation Container. If the allocation element does not have the necessary visibility to identify directly which orchestrating or managing element or elements to contact, it may therefore identify a VNFM managing a VNF which will be affected by the planned resource allocation adjustment by requesting the identity of the VNFM managing an affected VNF from another NFV-MANO element, such as a NFVO Many other variations or additions are envisaged and some will now be described.

Figure 7:
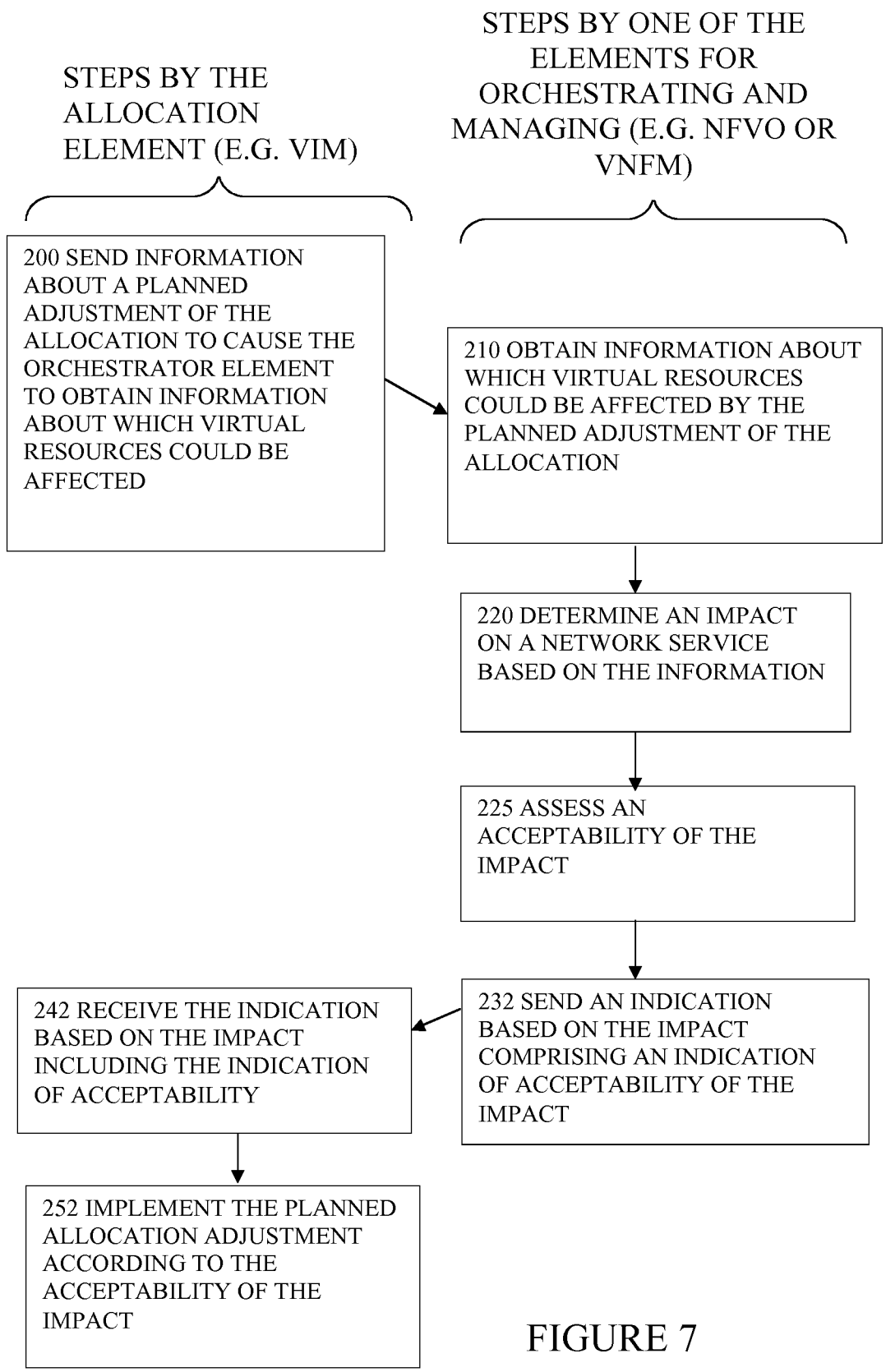

FIG. 7, Embodiment Showing Dependence on Acceptability of Impact

FIG. 7 shows steps similar to those of FIG. 6, and corresponding reference numerals have been used as appropriate. In addition, after step 220 of determining the impact, there is a step 225 of assessing an acceptability of the impact, based on the determination of the impact. Also, the step of sending the indication based on the impact comprises sending 232 an indication of the acceptability of the impact to the allocation element. This is received by the allocating element as shown by the step of receiving 242 an indication of the acceptability of the impact on the network service. Then at step 252 the allocating element is shown as implementing the planned adjustment of the allocation according to the acceptability of the impact. An effect of indicating acceptability is that this may be more convenient or easier for the allocating element to interpret and use than other representations of the impact. The indication of acceptability can encompass a binary indication of acceptable or unacceptable, or more granular indications having various degrees of acceptability, which might assist in a longer negotiation between allocation element and the one or more of the elements for orchestrating and managing for example. A binary indication can be in the form of proceed or not proceed, thus can be regarded as an authorisation by the one of the elements for orchestrating and managing, to implement the planned allocation. This can avoid the need for the allocation element to know how to interpret a more detailed indication with context of the impact, or to apply a threshold to a raw number or value for example.

Figure 8:
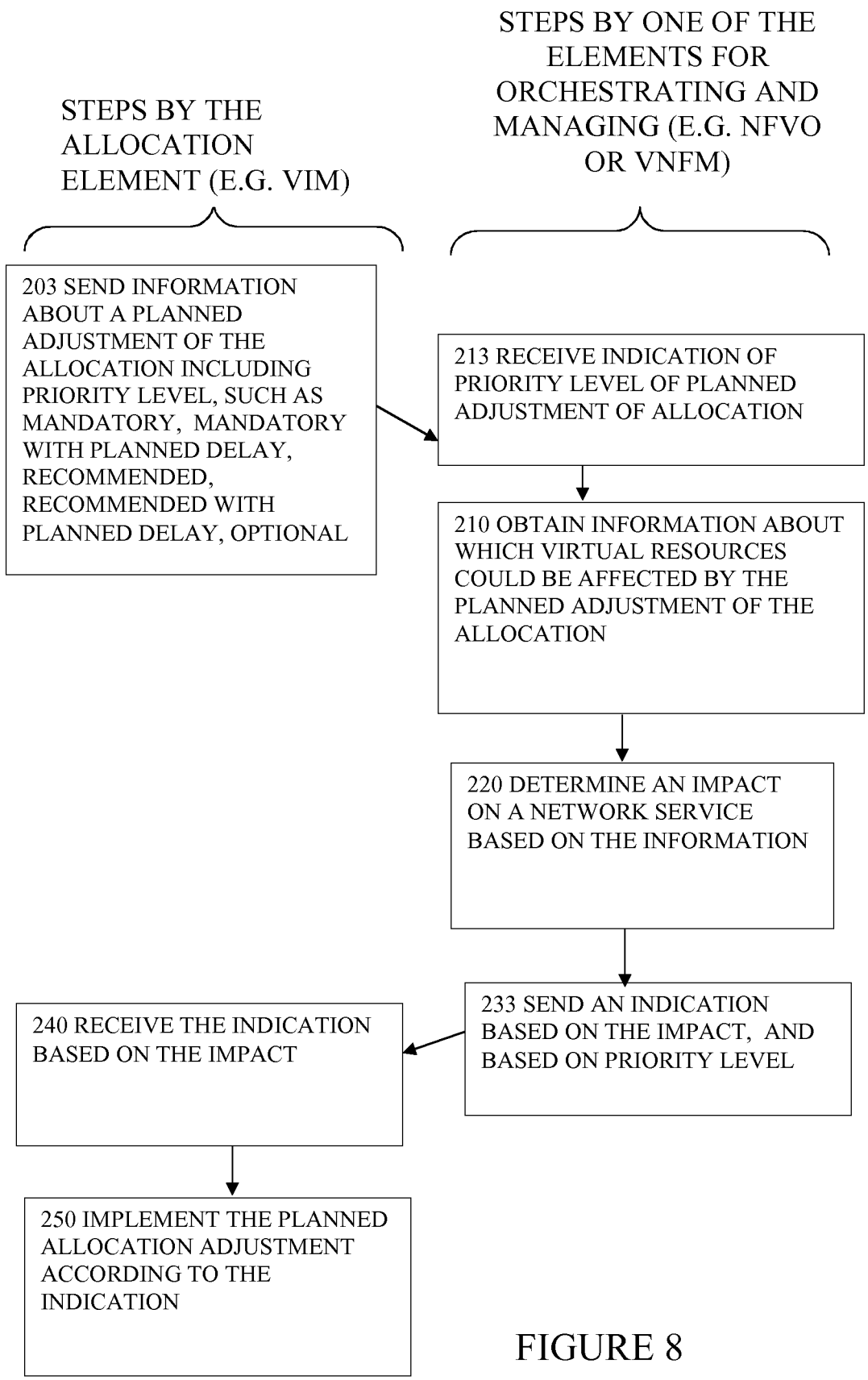

FIG. 8, Embodiment Showing Providing Priority Level of Planned Adjustment

FIG. 8 shows steps similar to those of FIG. 6, and corresponding reference numerals have been used as appropriate. In addition, the initial step by the allocation element for sending the information about the planned adjustment of the allocation, now comprises sending 203 an indication of a priority level of the planned adjustment of the allocation. Priority level is intended to encompass an override indication, in other words the priority level is sufficiently high that the adjustment needs to take place even if not accepted or authorised by the one of the elements for orchestrating and managing. The priority level could also encompass a severity parameter indicating a severity of a problem causing the need to adjust the allocation.

In addition to the method of FIG. 6 there is also shown a preliminary step by the one of the elements for orchestrating and managing, of receiving the indication 213 of a priority level of the planned adjustment of the allocation, and the step of sending the indication based on the impact can be carried out 233 based on the received priority level. An advantage of passing knowledge of priority level to the element or elements for orchestrating and managing is that it can be useful to make the response of that element or elements more appropriate to the circumstances and thus improve a trade off between network service impact and allocation efficiency.

As shown in step 203, the indication of priority level of the planned allocation adjustment can indicate a priority level chosen from two or more levels of priority. Examples of different levels of priority can include any of the following: mandatory without delay, mandatory with a planned delay, recommended, recommended with a planned delay, or optional. These are some useful types of priority level, others are conceivable.

Figure 9:
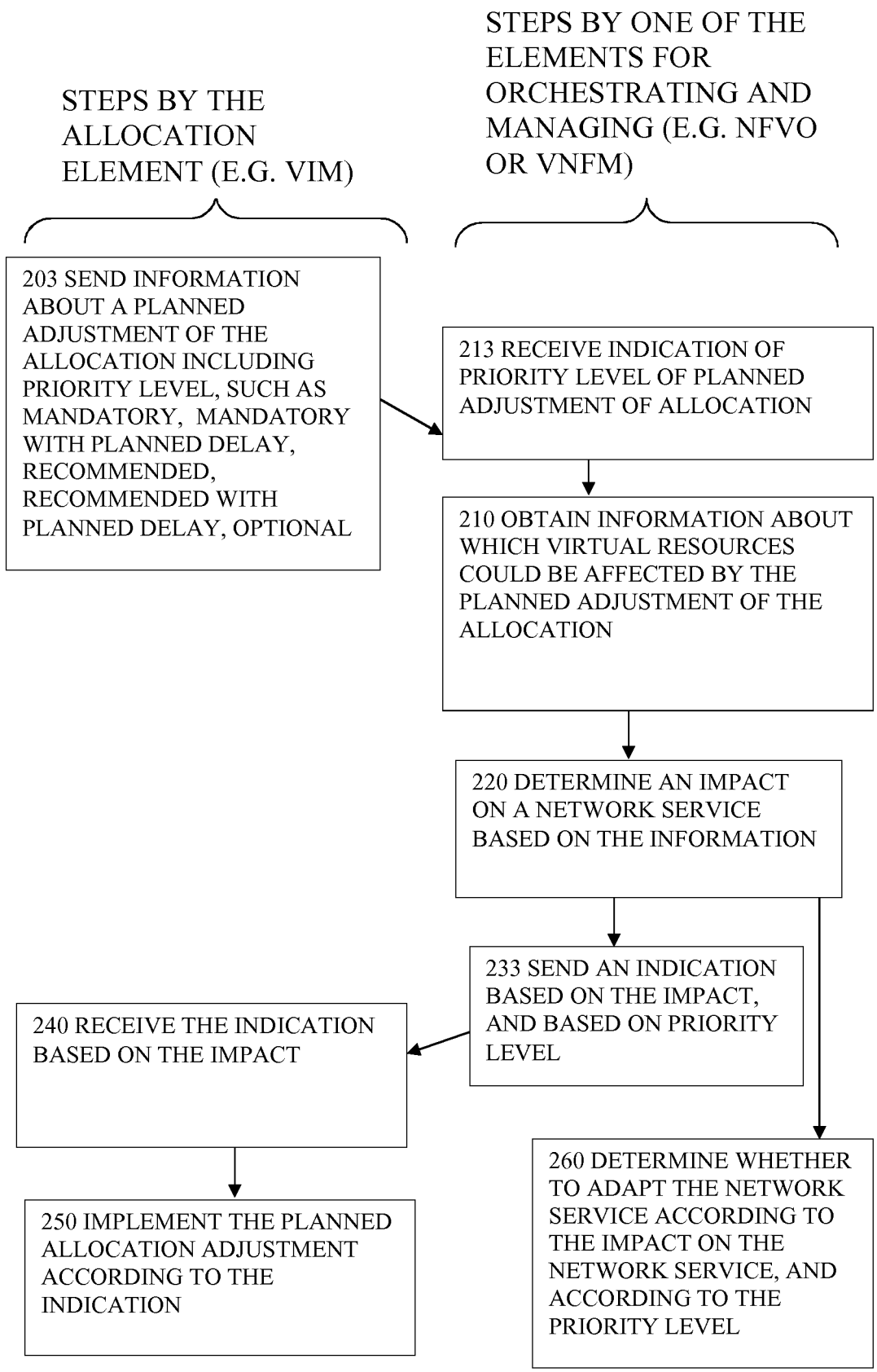

FIG. 9, Embodiment Showing Consideration of Adapting Network Service

FIG. 9 shows steps similar to those of FIG. 8, and corresponding reference numerals have been used as appropriate. In addition, after the step 220 of determining the impact on the network service, there is a step by the one of the elements for orchestrating and managing, of determining 260 whether to adapt the network service to compensate for the planned adjustment of the allocation according to the determination of the impact on the network service and according to the indication of priority level. This can be useful to improve the trade off between network service impact and allocation efficiency. Adapting the network service can be defined as encompassing for example adapting the VNFs used, or adapting relationships between the VNFs, adapting affinity/non affinities, or other adaptations. In this case the indication based on impact can take into account the adapting of the NS, rather than the impact before adaptation.

Figure 10:
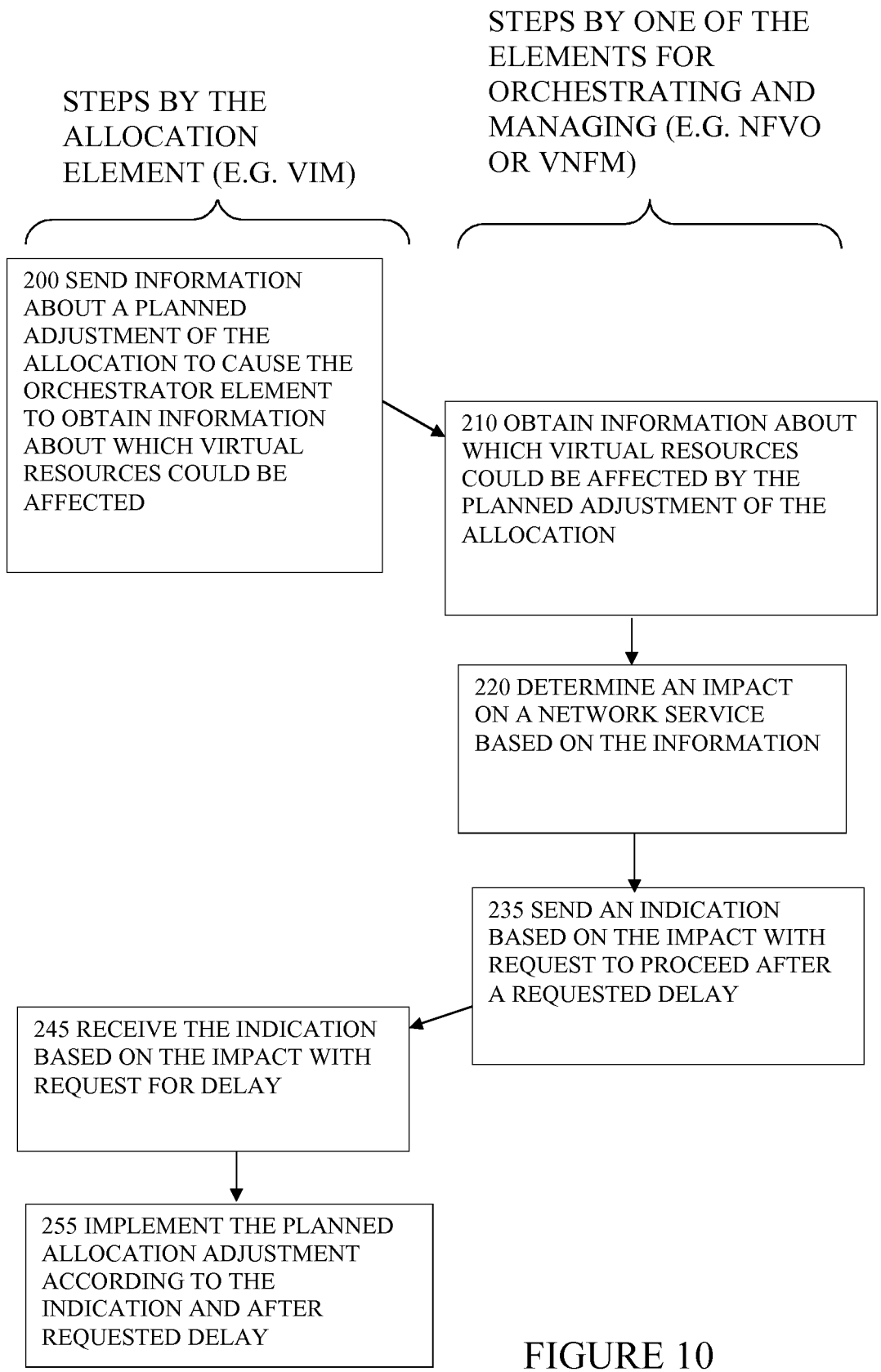

FIG. 10, Embodiment Showing Requesting Delay Before Implementation

FIG. 10 shows steps similar to those of FIG. 6, and corresponding reference numerals have been used as appropriate. In addition, after the step 220 by the one of the elements for orchestrating and managing, of determining the impact on a network service, the step of sending the indication based on the impact now further comprises sending 235 a request to proceed with the planned allocation adjustment after a requested delay. Correspondingly, the actions of the allocation element now show a step of receiving the indication based on the impact comprises receiving 245 a request to proceed with the planned allocation adjustment after the requested delay, and the step of implementing is carried out 255 after the requested delay. This requested delay can enable for example graceful termination of traffic engagements and rejection of new traffic before any disruption caused by the adjustment of the allocation.

Figure 11:
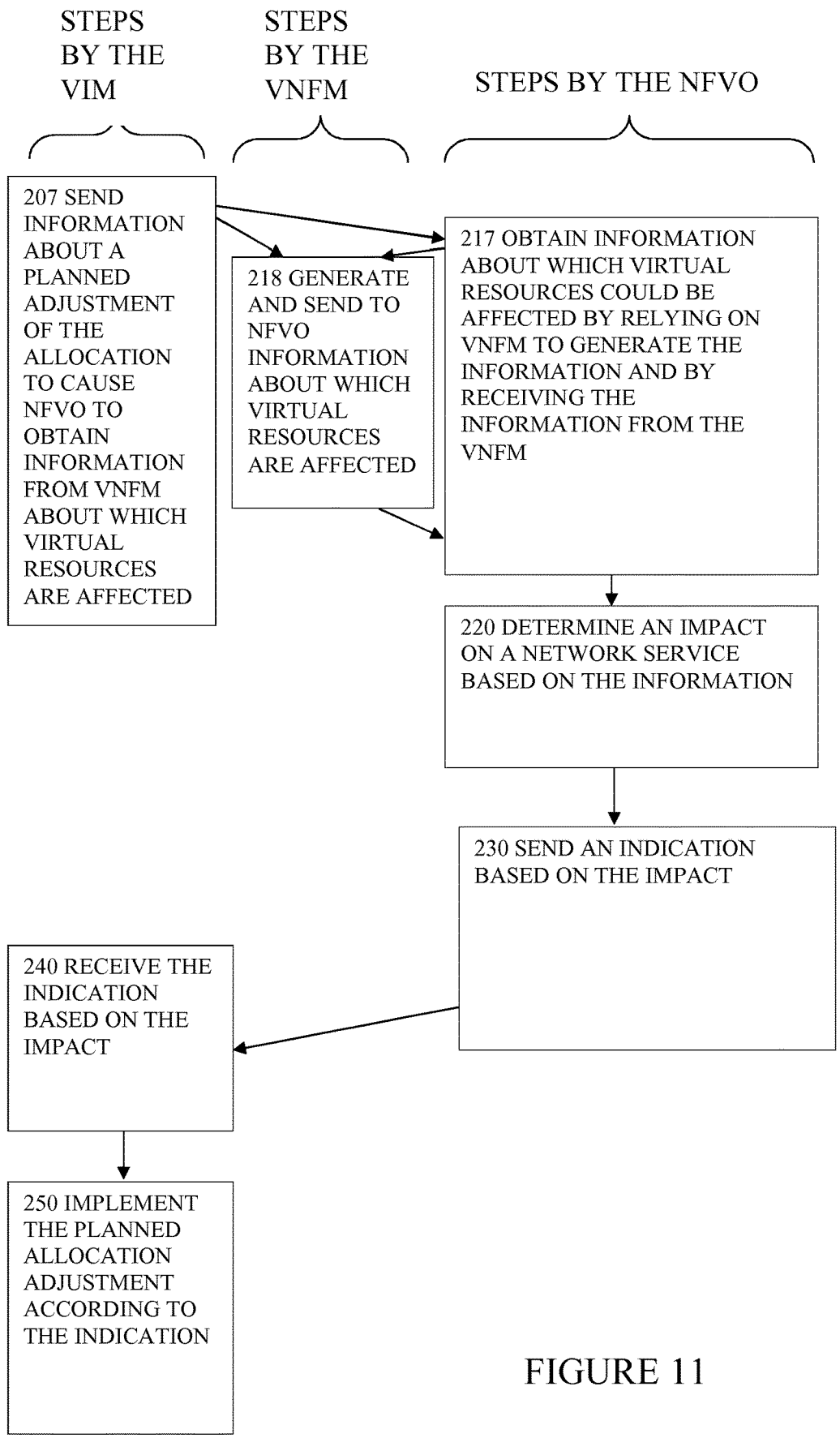

FIG. 11, Embodiment Showing NFVO as the One of the Elements

FIG. 11 shows steps similar to those of FIG. 6, and corresponding reference numerals have been used as appropriate. In FIG. 11, the one of the element for orchestrating and managing is the NFVO, and the steps shown for the NFVO are in addition to the usual functions of the NFVO in orchestrating at the NS level. So at step 217 the NFVO obtains the information about which virtual resources could be affected. This can involve causing or relying on the VNFM to generate and send at step 218 this information to the NVFO, which receives it at step 217. Then the further steps 220 of determining the impact on a network service, and sending 230 an indication based on the impact, are carried out by the NFVO. This is useful as the NFVO is a convenient element for this, having knowledge of the network service and how the VNFs contribute to the service, as well as having connection to the VNFM.

FIG. 11 also shows the option of the steps of the allocation element being carried out by the VIM, so at step 207, the VIM sends the information about the planned adjustment to the NFVO, either directly or via the VNFM, to cause the NFVO to obtain the information about which virtual resources could be affected. As before, the allocation element in the form of the VIM, receives 240 the indication based on the impact from the NFVO and implements 250 the planned adjustment of the allocation according to the impact. The indication of impact can be in any form as discussed above in relation to FIGS. 6 and 7 for example. These flows of information are useful to provide a negotiation between the VIM and NFVO to achieve a good trade off between network service impact and allocation efficiency. Features of other embodiments described above can optionally be combined with those shown in FIG. 11, such as the option of the NFVO adapting the network service, or requesting a delay before implementation, as discussed above.

Figure 12:
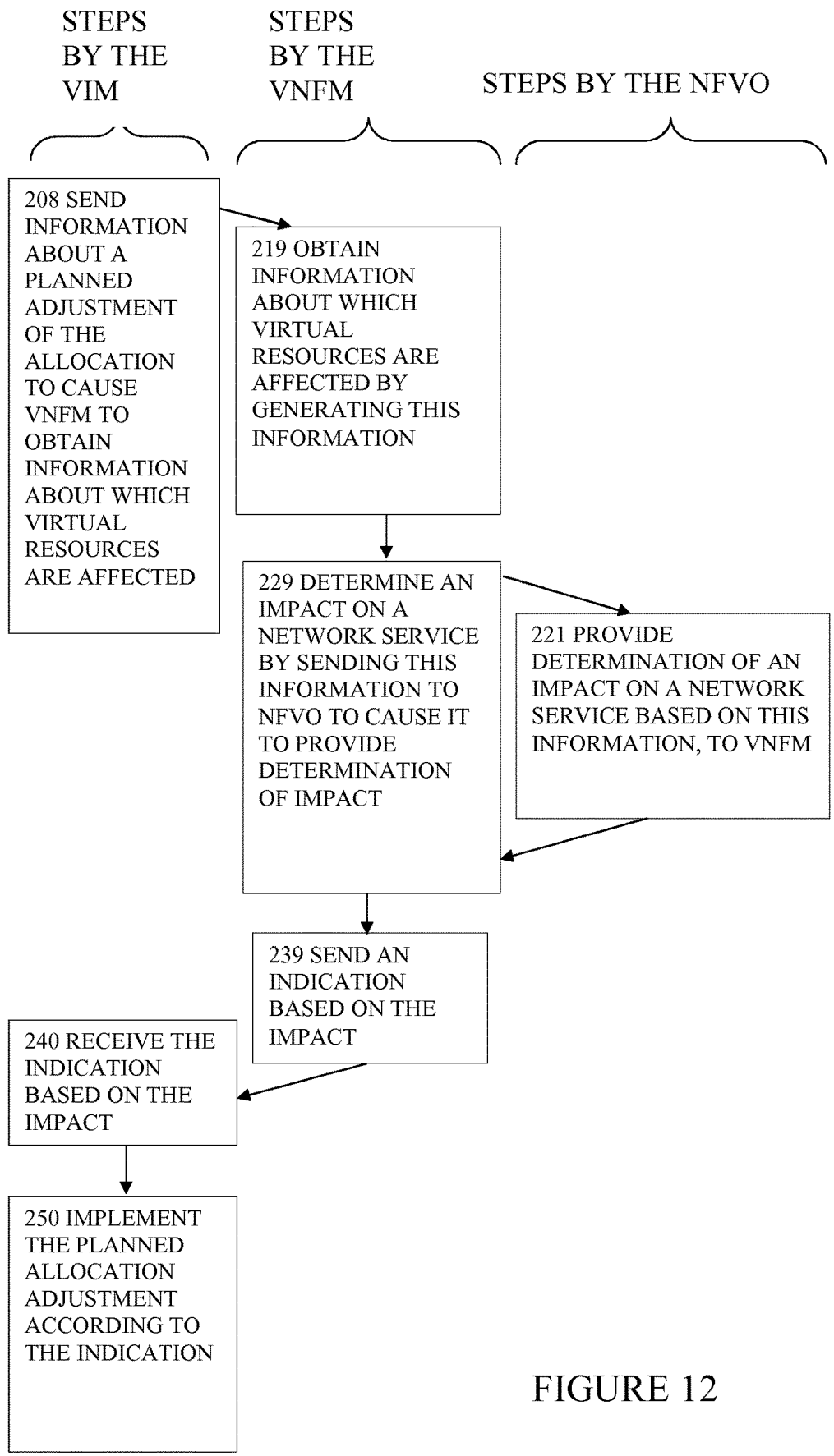

FIG. 12, Embodiment Showing VNFM as the One of the Elements

FIG. 12 shows steps similar to those of FIG. 11, but the one of the elements for orchestrating and managing is the VNFM, and the steps shown for the VNFM are in addition to the usual functions of the VNFM in managing at the VNF level. So the step by the allocation element of sending the information about the planned adjustment comprises sending 208 the information to the VNFM to cause it to obtain the information about which of the virtual resources such as VNFs could be affected. Then the step of obtaining the information about which of the virtual resources could be affected comprises a step 219 of generating this information, carried out by the VNFM. The step of determining the impact is carried out indirectly in that the VNFM gets the determination by sending 229 to another element of the NFV-MANO, (in this case the NFVO) information about which of the virtual resources could be affected and causing the NFVO to provide 221 the determination of the impact to the VNFM. The step of sending the indication based on the impact comprises the VNFM sending 239 the indication to the allocation element in the form of the VIM. The indication of impact can be in any form as discussed above in relation to FIGS. 6 and 7 for example. Carrying out these steps by the VNFM is useful as typically it is in a good position to coordinate the communication with the allocation element and has ready access to knowledge of which virtual resources such as VNFs may be affected. Nevertheless, in highlighting the role of the VNFM, this does not necessarily imply that the VNFM is in control of this process of checking for impact. It could still be subordinate to the NFVO while carrying out these steps of obtaining, determining and sending, and may need to be to comply with standards. As before, the allocation element in the form of the VIM, receives 240 the indication based on the impact from the VNFM and implements 250 the planned adjustment of the allocation according to the impact. Features of other embodiments described above can optionally be combined with those shown in FIG. 12, such as the option of the NFVO adapting the network service, or requesting a delay before implementation, as discussed above. In another example combining features of FIGS. 11 and 12, the steps of the element for orchestrating can be carried out shared by the VNFM and the NFVO as appropriate.

Figure 13:
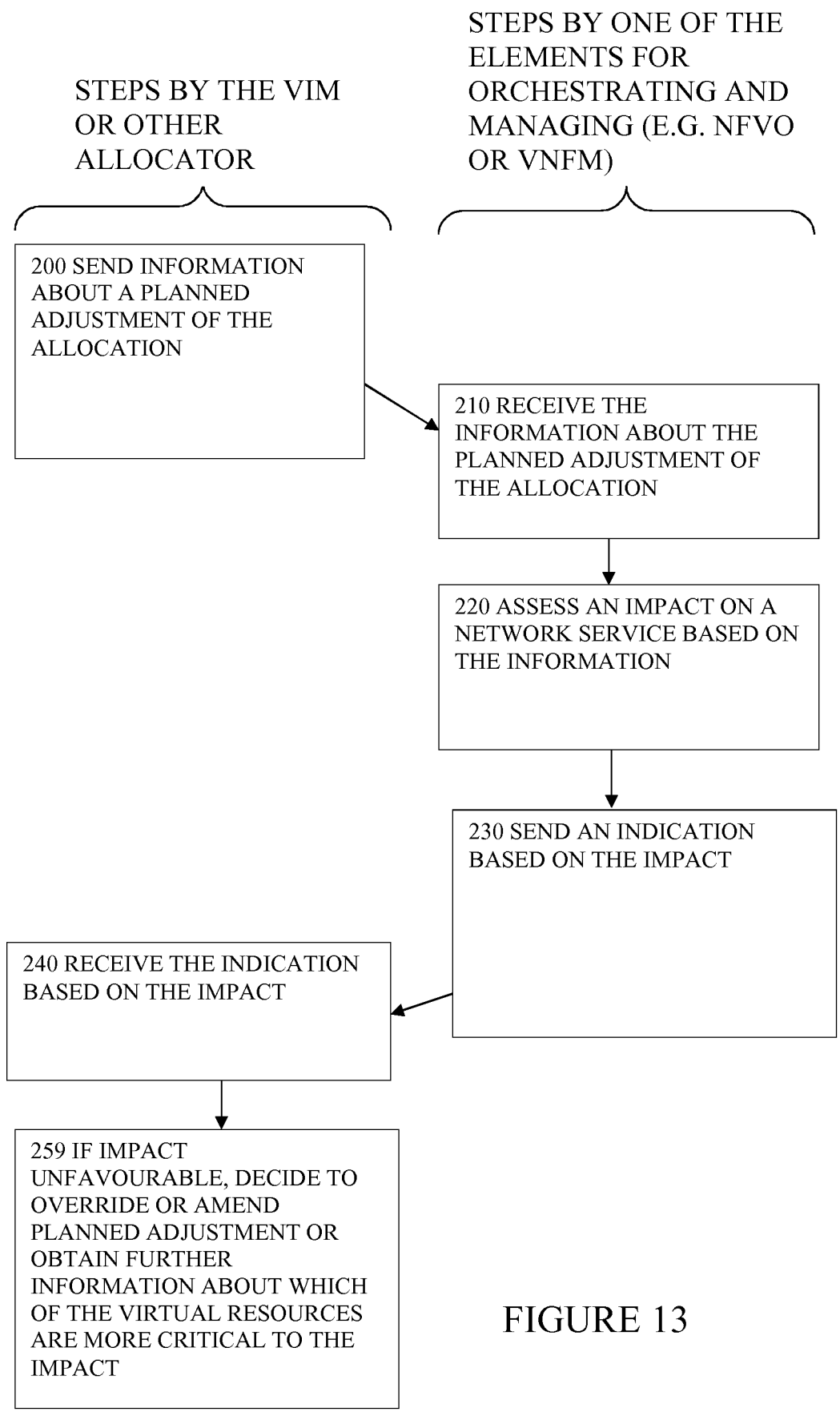

FIG. 13, Embodiment Showing Reactions to Unfavourable Indication of Impact

FIG. 13 shows steps similar to those of FIG. 6, and corresponding reference numerals have been used as appropriate. In addition, after the step 240 by the allocation element of receiving the indication based on the impact, the step 259 of implementing, comprises any one of: overriding an unfavourable indication of impact, or amending the planned adjustment, or obtaining information about which of the virtual resources are more critical to the impact than others of the virtual resources. This can facilitate amending the planned adjustment to reduce the impact by avoiding using those of the virtual resources which are more critical for example. Again this can help enable a better negotiation between allocating element and the element or elements for orchestrating and managing and ultimately lead to a better trade off between network service impact and allocation efficiency.

Figure 14:
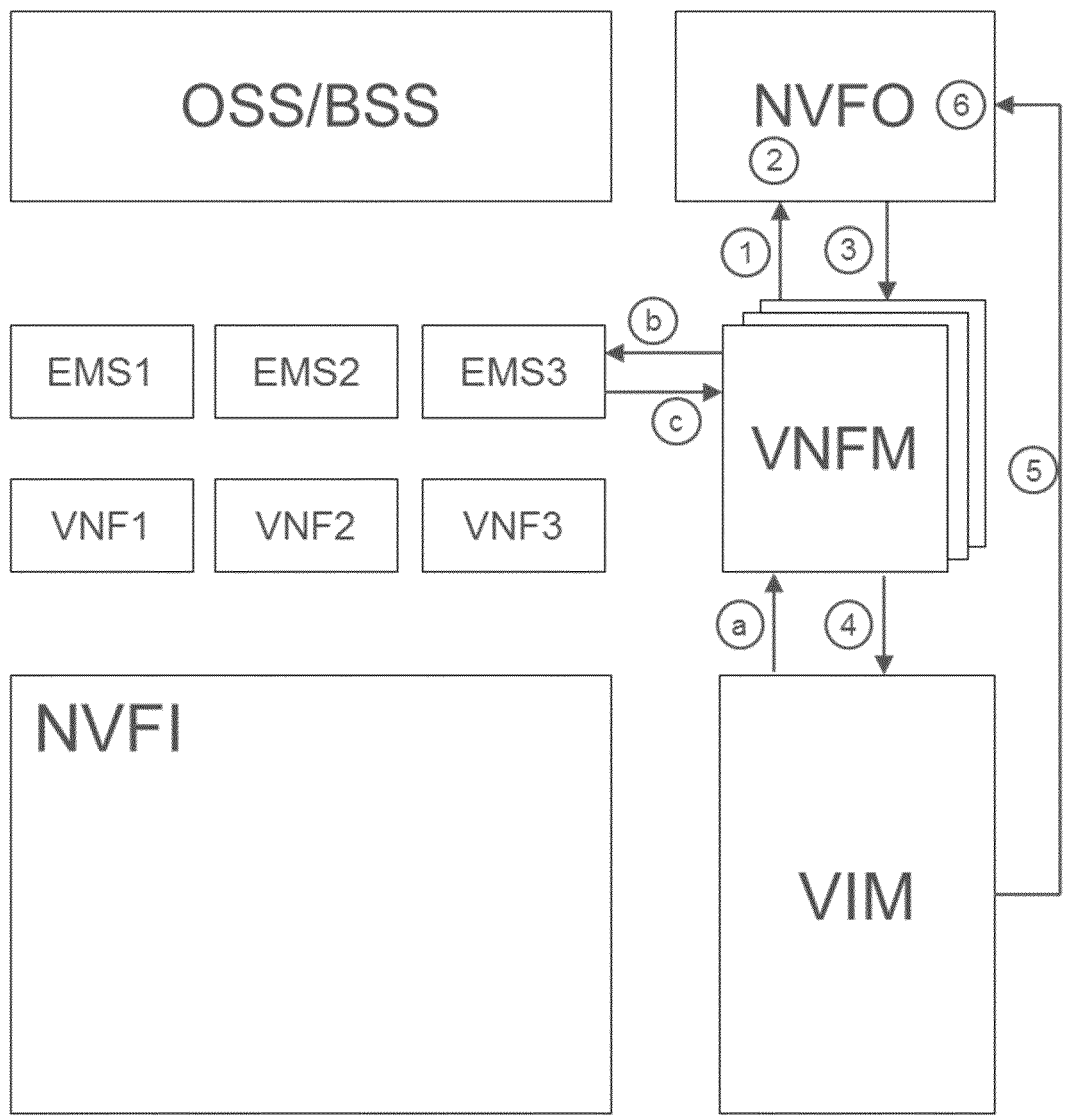
FIGS. 14 and 15 show schematic views of arrangements and related steps according to embodiments.
Figure 15:
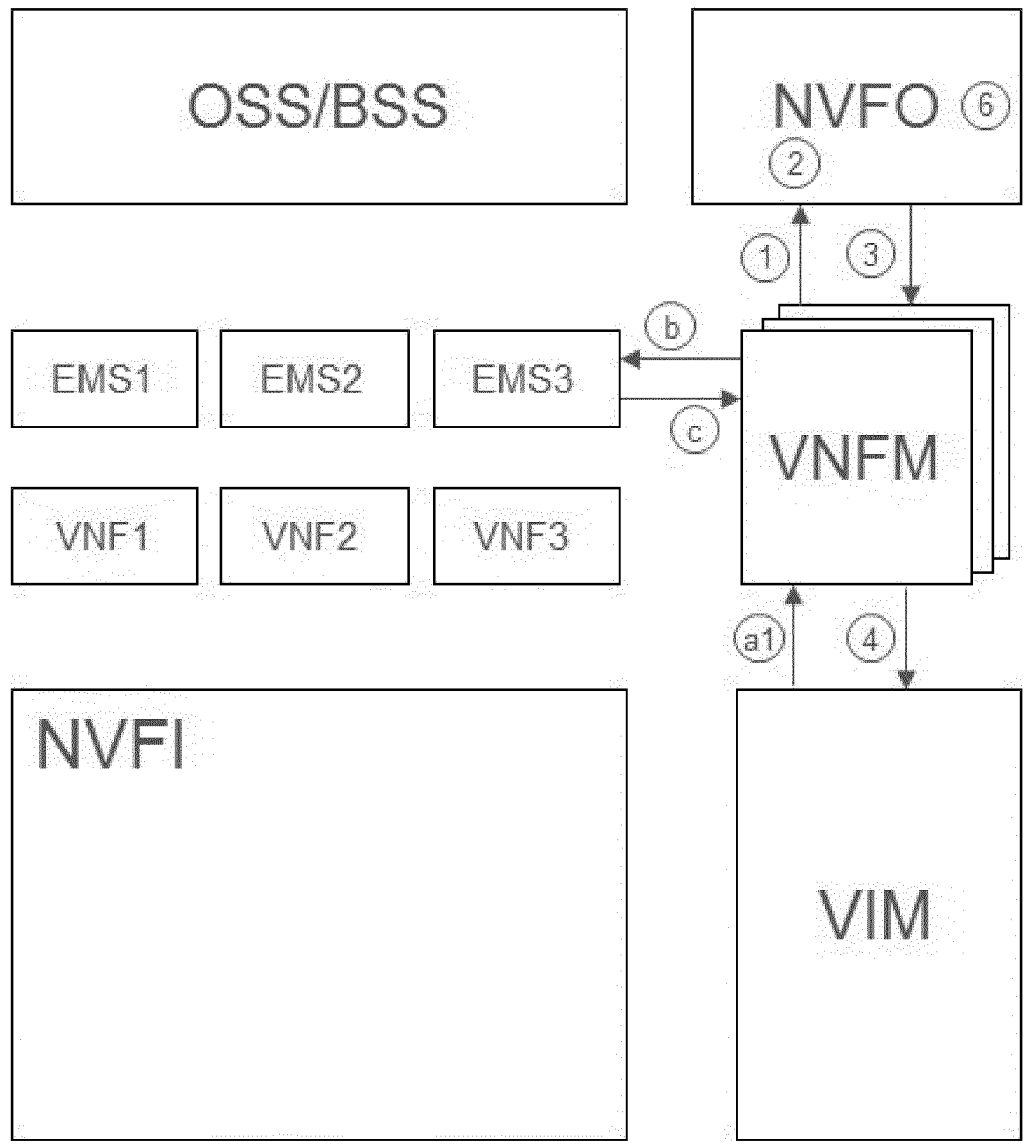

FIGS. 14, 15 Embodiments Showing which Interfaces are Used by Steps

Figure 2:
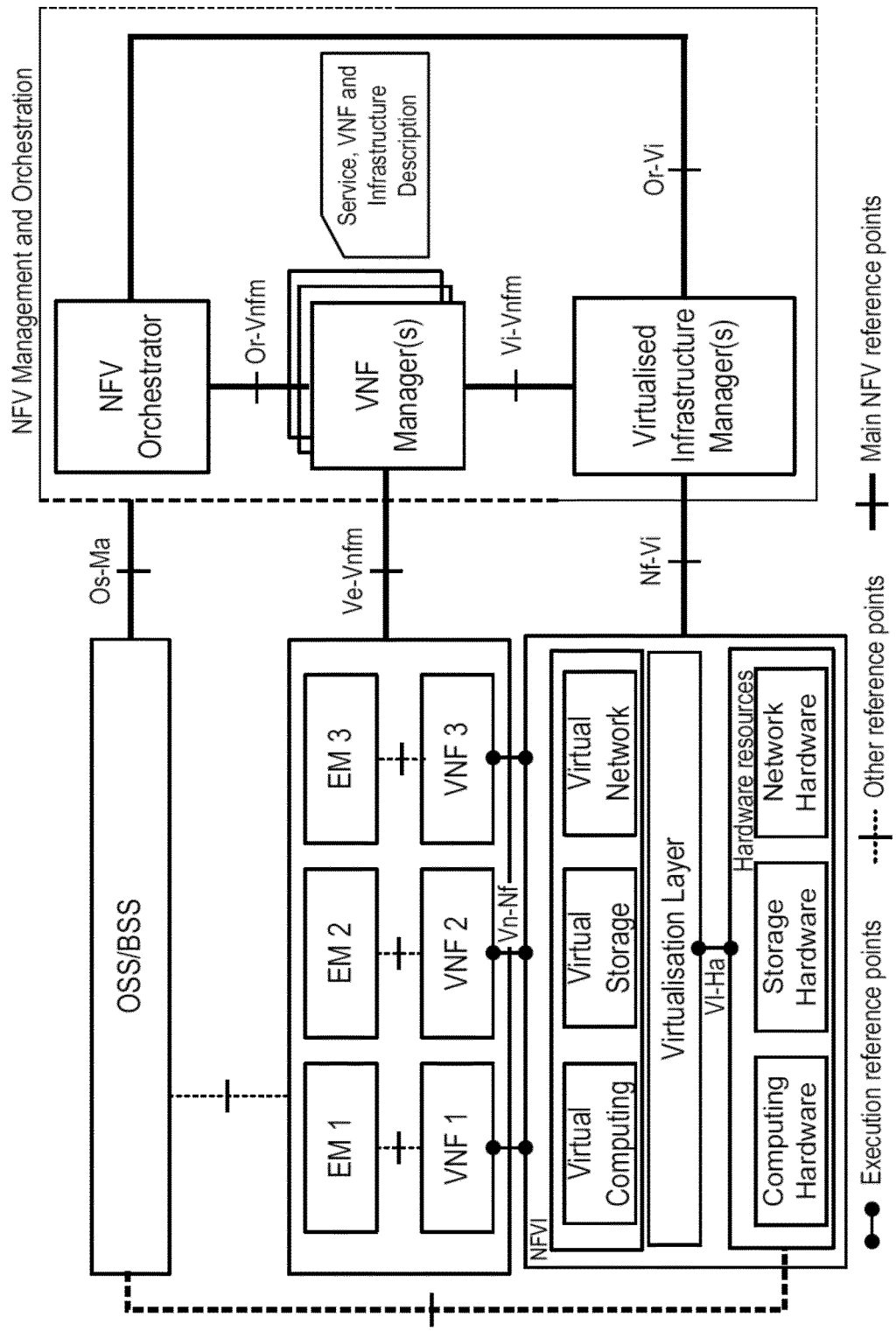

FIG. 14 shows a schematic view of elements and interfaces similar to that of FIG. 2. Also shown are arrows between the elements to indicate information exchange at various steps. At arrow a) the VIM sends to the planned adjustment of allocation to the VNFM. At arrow b), for a particular VNF, the VNFM interacts on VNF level with the EM to check if the change is allowed without impacts or if it will cause any service unavailability. Arrow c) shows the response from EMS to VNFM. If there is some effect and in a case of suspected/possible Network Service (NS) level unavailability, the VNFM informs the NFVO, shown by arrow 1). The NFVO analyses impacts on the network service (NS) shown by number 2) and takes actions or rejects it. The NFVO replies to VNFM at arrow 3) and the VNFM notifies the VIM at arrow 4). Optionally, if the NS impact is unfavourable and the NFVO/VNFM indicates it rejects the change, then either the VIM just accepts this and the change is not implemented, or the VIM decides to overrule the indication from the NFVO/VNFM and advises the NFVO as shown by arrow 5). The NFVO optionally takes actions to mitigate the network impacts, shown by number 6).

FIG. 15 shows features similar to FIG. 14. In this case at step a1) the priority level is indicated by the VIM and this is passed on to the NFVO. Hence there is no need for arrow 5 of the VIM indicating it will override an unfavourable indication of impact. If the NVFO makes such an indication of impact, it can proceed with mitigation actions at step 6) without waiting for an indication from the VIM.

FIGS. 16 to 19, Examples with More Details of Messages

Figure 16:
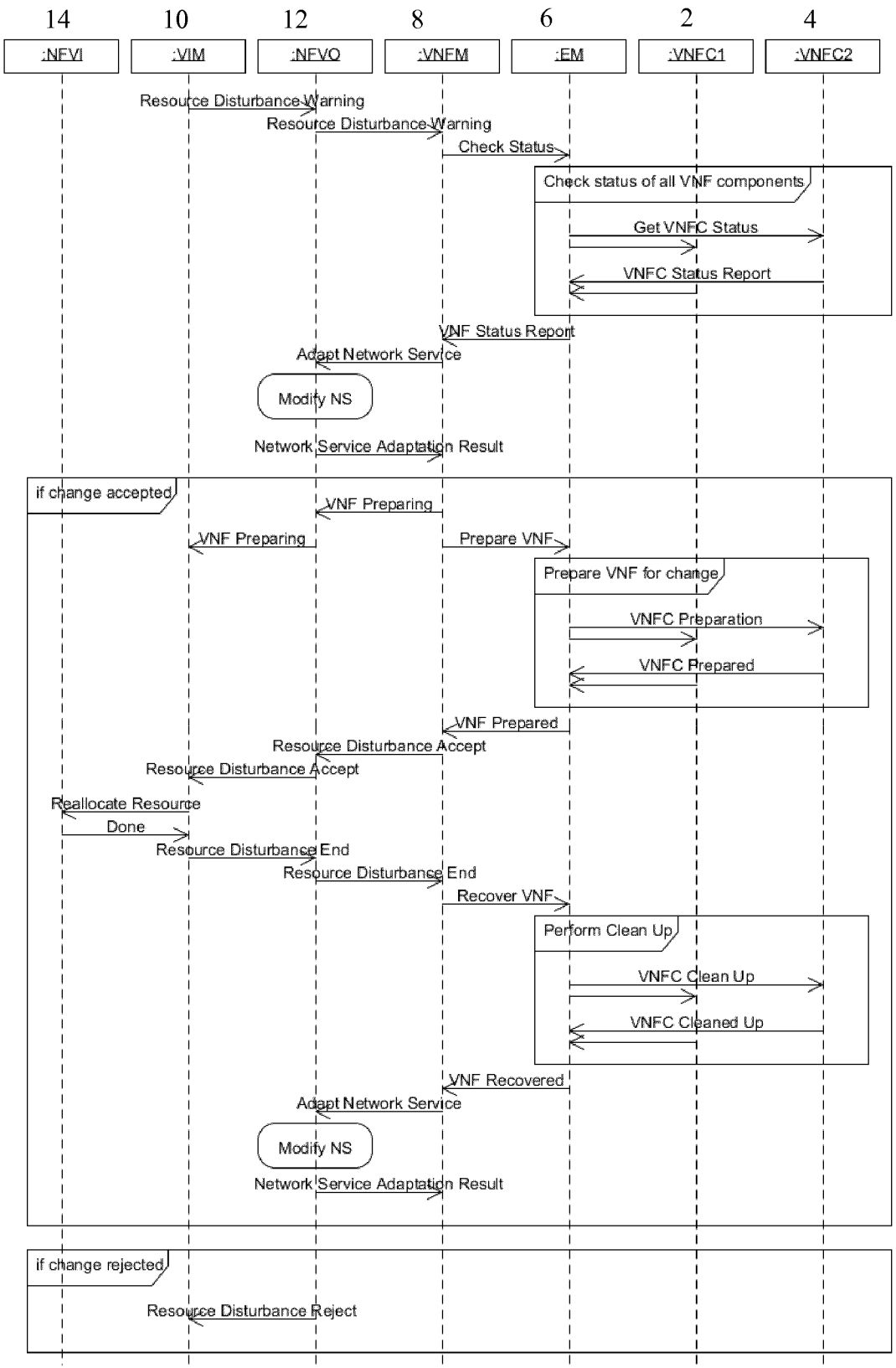
FIGS. 16 to 20 show sequence charts of embodiments.

FIG. 16 shows a sequence chart with time flowing down the chart and each column represents a different element. It illustrates an example of intra NFVI-PoP adjustment in which a VNF comprises two VNF component instances 2, 4, and a VIM 10, acting as the allocation element which plans to migrate VNF component instances between different computer hosts. It will be appreciated that message names illustrated in the message sequence are merely examples of possible message names that could be used. Initially, the VIM 10 establishes a need to perform a resource allocation adjustment that may affect a particular Virtualisation Container hosting a VNF component instance. This need might be established on the basis of an operator trigger or because of an automatic policy or for any other reason. The VIM 10 either knows the relation between the affected Virtualisation Container and its corresponding VNFM 8 or it may fetch this information from the NFVO 12.

Alternatively, as illustrated, all communication with the VNFM may be performed through the NFVO. The VIM 10 then contacts the VNFM 8 to request permission to perform the resource allocation adjustment (labelled "resource disturbance warning" from VIM to NFVO then NFVO to VNFM. Note this differs from FIGS. 14 and 15 in which the VIM contacts the NFVO directly at the outset without going via the NFVO. Both alternatives are feasible). This can include a severity parameter having multiple level indications (e.g. i) Mandatory, cannot postpone, ii) Mandatory, can postpone, iii) Recommended, iv) Optional, etc.). This is introduced so that the VIM can, for example, enforce the change stating that it is mandatory and cannot be postponed. The VNFM 8 contacts the EM 6 associated with the VNF component instance hosted on the affected Virtualisation Container to check its operative status. The EM 6 checks the operative status of all VNF component instances and sends a VNF status report including an indication as to whether the VNF can accommodate the planned resource allocation adjustment. The indication may for example be one of: "OK", "OK, execute after time x", or "Not OK, re-attempt after time y". In case of suspected/possible Network Service (NS) level unavailability during NFVI-PoP (internal) resource reallocation, or simply because so instructed by configuration option, the VNFM informs the NFVO. The message to the NFVO also includes information about the type of impact to be expected for the VNF e.g. loss of VNF connectivity or performance degradation.

The NFVO analyses impacts on the network service (NS), shown by the box "modify NS" using the defined relationship between VNFs (and PNFs) under NFVO control, the architectural logic and so on. The NFVO replies to VNFM with an indication of impact. One possible indication is that the NFVO accepts the request with no kind of change on current Network Services. Another possibility can be that NFVO modifies the NSs so that a specific VNF unavailability does not propagate on network level, then it accepts the request, and the subsequent procedure is shown in a large box labelled "if change accepted".

Another possibility shown lower down in a box labelled "if change rejected" is that the NFVO does not accept the change and sends a negative reply to VNFM. Optionally a delay time value can be provided, after which VIM is supposed to trigger a new attempt. The VNFM replies through the NFVO to the VIM. In case the NFVO and the VNFM do accept the planned adjustment of the allocation, the VNFM 8 then triggers preparatory actions to be performed by the VNF component instances and informs the VIM 10, via the NFVO 12, that preparations are taking place. The EM 6 informs the VNFM 8 when preparations are complete, and the VNFM 8 then sends a positive answer to the request for permission to perform the resource allocation adjustment.

This answer is again sent via the NFVO 12. On receipt of the granted permission, the VIM 10 checks for resource availability to support the resource allocation adjustment, and orders the NFVI 14 to perform the adjustment. The NFVI confirms that the adjustment has been completed and this confirmation is passed to the VNFM 8. The VNFM 8 then triggers clean up operations in the VNF, which, when completed, are reported back to the VNFM 8 by the EM 6. It will be appreciated that the VNFM does not need to know the specific identities of the resources for which the allocation is to be adjusted. It is sufficient that the request for permission sent by the VIM indicates a reference to the affected Virtualisation Container, the affected resource type and a qualification about the kind of impact on resource availability. If the NFVO has to make adaptations to the NS following the clean up, this is shown by the "modify NS" box and the NS adaptation result is reported back to the VNFM.

The described example is based on providing preventive checks and indications to the VIM based on the impact in the form of answers such as yes proceed or no do not proceed or (optional) yes proceed with delay to allow preventive countermeasures such as graceful termination of traffic engagements and rejection of new engagements. In case of delays the system can wait and implement a locking mechanism preventing further operations of other Virtualisation Container's in the same NFV.

Figure 17:
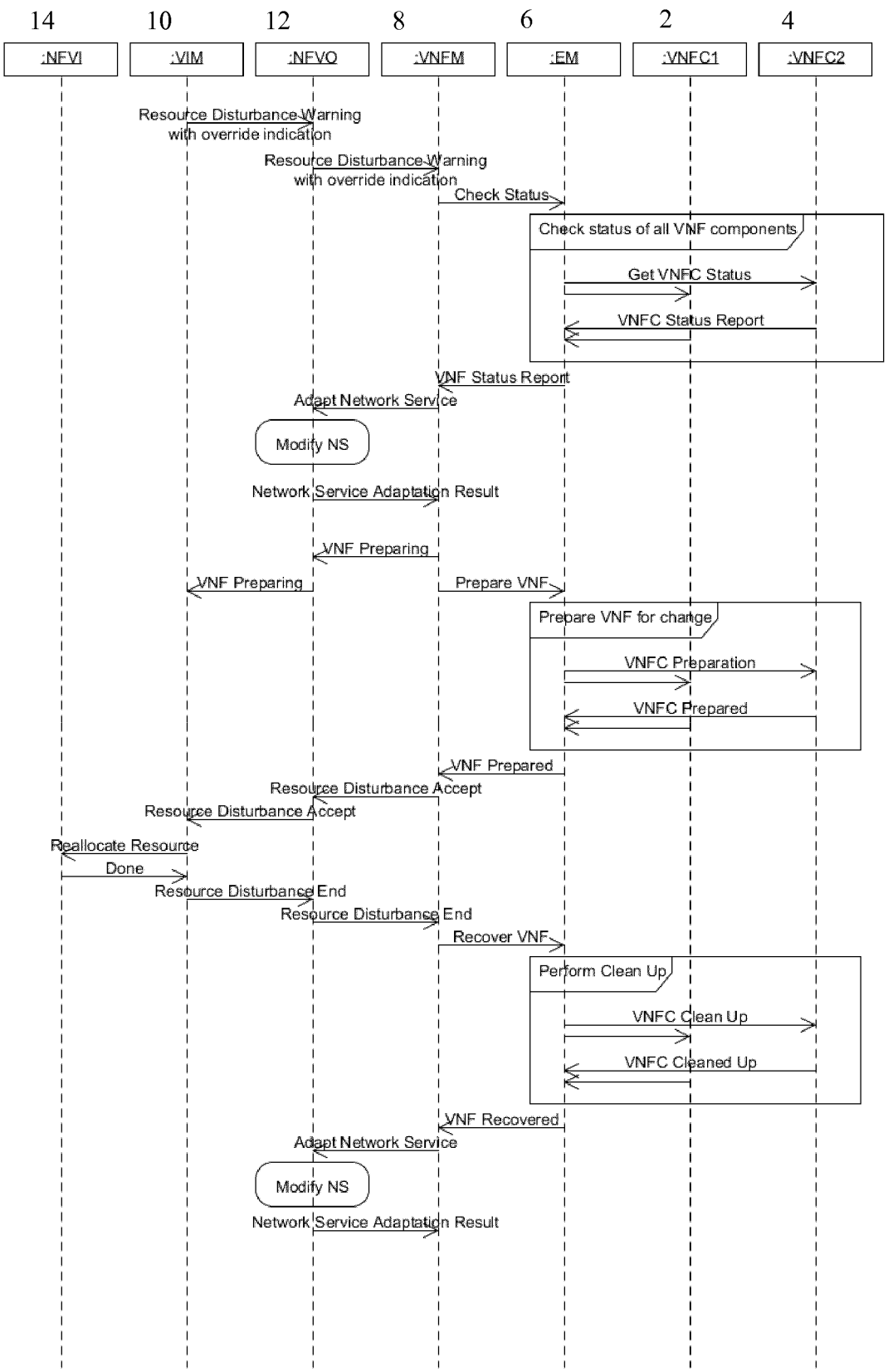

FIG. 17 shows a similar example to that of FIG. 16, also showing intra NFVI-PoP reallocation, but in this case, a priority level indication in the form of an override indication is sent from the VIM at the outset. This means there is no need for the steps of the box in FIG. 16 labelled "if change rejected", since the VIM goes ahead anyway with the planned adjustment. The example of FIG. 17 can be an alternative to that of FIG. 16 or can take place after the example of FIG. 16 in the case the NFVO and VNFM reject the change to the VIM. Then if the VIM overrules the indication it can repeat the procedure again including an override indication in the Resource Disturbance Warning sent to NFVO as shown in FIG. 17. Upon reception of such indication, the VNFM will always accept the resource modification and initiate network modification as well as preparation and recovery of the VNF. For this latter case the overrule decision could be an operational decision, considering different service level agreements with cloud tenants.

In case of suspected/possible Network Service (NS) level unavailability during NFVI-PoP (internal) resource reallocation, or simply because so instructed by configuration option, the VNFM informs the NFVO of the VNFs affected. The information is enforced with new flags over the existing interface stating that the change is mandatory and cannot be postponed. The message to the NFVO also includes information about the type of impact to be expected for the VNF e.g. loss of VNF connectivity or performance degradation. The NFVO analyses impacts on the network service (NS), the defined relationship between VNFs (and PNFs) under NFVO control, the architectural logic and so on. Then it may compensate for the impact by re-shuffling the NS to compensate the change in the underlying infrastructure.

A planned downtime or predicted shortage of a physical resource may be compensated at the expense of the tenant with lowest agreed service level. For the affected VNF an extreme recovery mechanism could be required, preserving, at the same time, the already established relationship between VNFs (and PNFs) under NFVO control, the architectural logic and so on. Even a single HW board or a cabinet failure can trigger overrule. The request from VIM to NFVO could lead to "network healing", so to compensate the loss of service by adapting the NS, or the NFVO could consider support for affinity/anti-affinity over multiple PODs and locations of assigned resources to a specific logical network.

Figure 18:
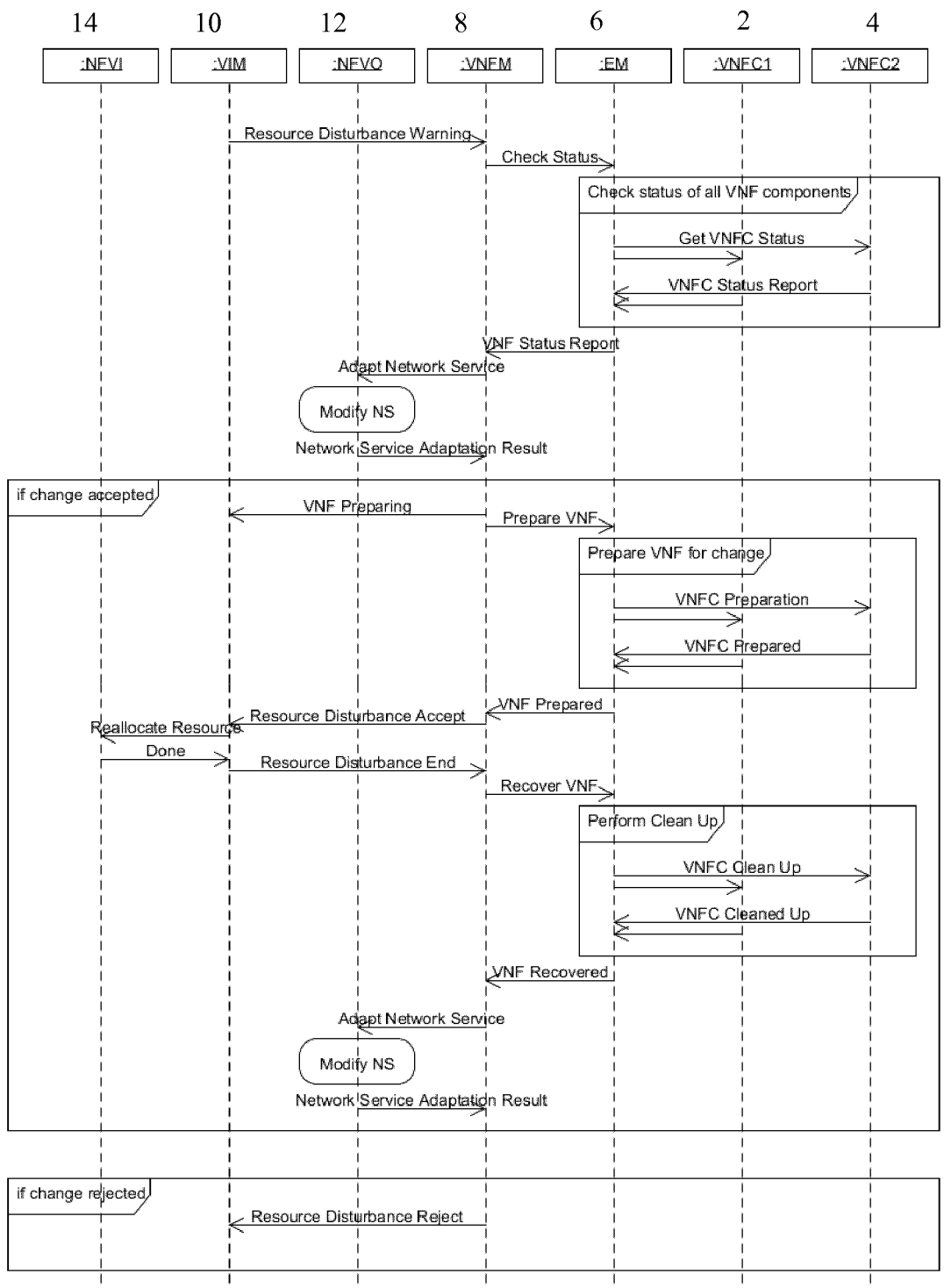
Figure 19:
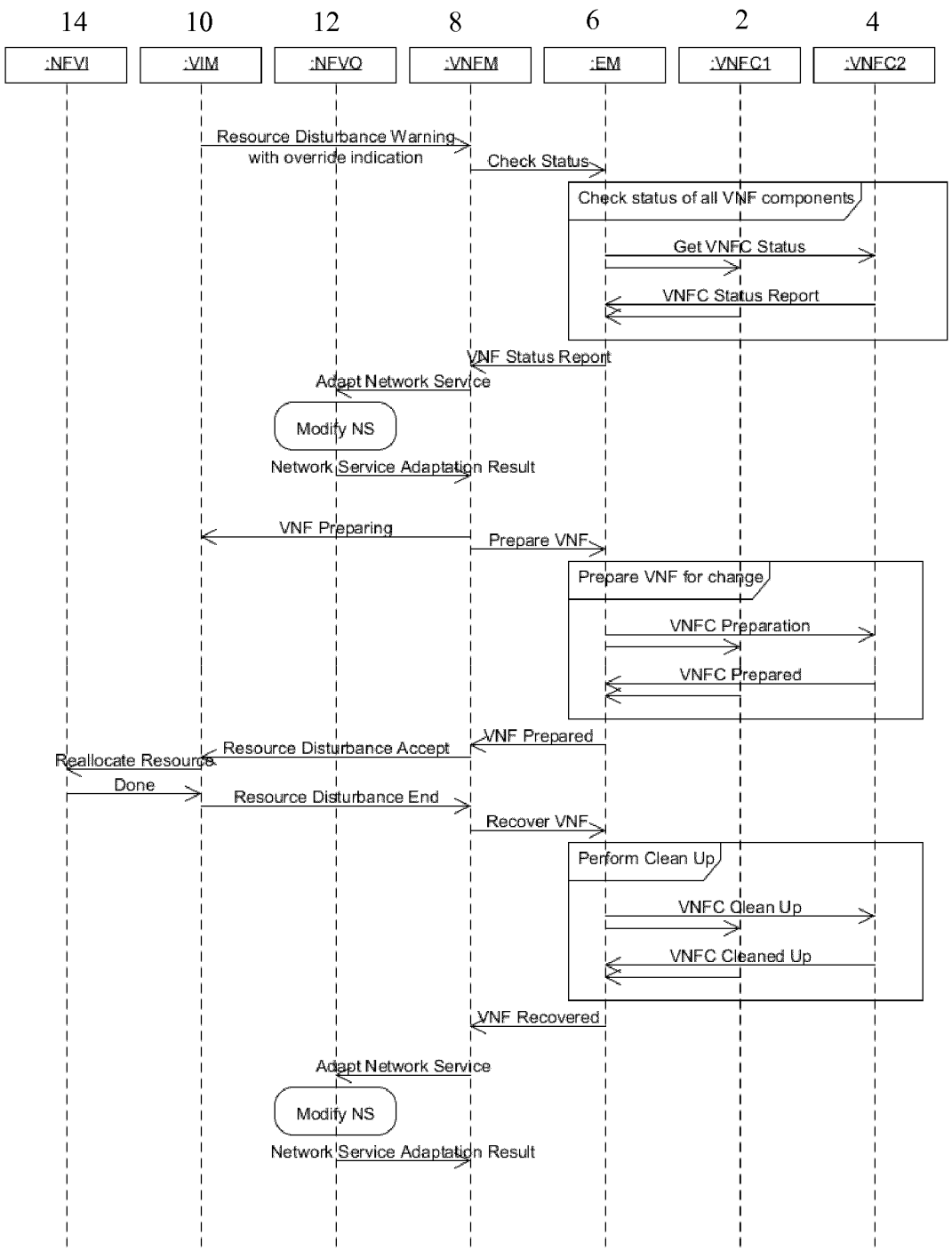

FIG. 18 shows a similar example to that of FIG. 16, of intra NFVI-PoP reallocation, but in this case the VIM communicates directly with the VNFM, rather than indirectly through the NFVO. The NFVO still carries out the determination of impact of the adjustment, shown by the first of the boxes labelled "modify NS". FIG. 19 shows a similar example to that of FIG. 17, but again in this case the VIM communicates directly with the VNFM, rather than indirectly through the NFVO.

FIG. 20, Inter NFVI-PoP Reallocation

FIG. 20 shows an example similar to that of FIG. 16 but for inter NFVI-PoP reallocation, in an arrangement such as that of FIG. 4, where there is a VIM1 for NFVI1 and a VIM2 for NFVI2. Both VIMs are coupled to a common VNFM, and to a common NFVO. In this case the adjustment is planned by the NFVO and so the steps of the allocation element in planning the adjustment of allocation are carried out by the NVFO. It is not only the NVFO which can plan or initiate such a reallocation. There can be alternative cases where the VIM indicates a problem to the VNFM, and the VNFM can determine that there are no more physical resources available at that PoP and so the VNFM can initiate a re-allocation of a VNF to another PoP. The NVFO sends the information about the planned adjustment to the VNFM 8 to request permission to perform the resource allocation adjustment (labelled "Resource disturbance warning"). As before, the VNFM 8 contacts the EM 6 associated with the VNF component instance hosted on the affected Virtualisation Container to check its operative status. The EM 6 checks the operative status of all VNF component instances and sends a VNF status report including an indication as to whether the VNF can accommodate the planned resource allocation adjustment.

The NFVO analyses impacts on the network service (NS), shown by the box "modify NS" using the defined relationship between VNFs (and PNFs) under NFVO control, the architectural logic and so on. The NFVO replies to the VNFM with an indication of impact on the NS (shown as "network service adaptation result"). If the NS impact is favourable, a similar procedure as shown in FIG. 16 is followed, of preparing the VNF for change, indicating that the VNF is prepared, then the NFVO initiates the inter-NFV migration, using VIM1 and VIM2. Communication between the NFVO, VIM1, NFVI1, VIM2 and NFVI2, required for the actual resource allocation adjustment between NFVI-PoPs, has not yet been standardised by ETSI and is thus illustrated as a white box in FIG. 20. The VIMs or NFVIs will confirm that the adjustment has been completed and this confirmation is passed to the VNFM 8. The VNFM 8 then triggers clean up operations in the VNF, which, when completed, are reported back to the VNFM 8 by the EM 6.

The alternative procedure if the change is rejected, also corresponds to that of FIG. 16 or FIG. 17. In case the VNFM rejects the change, then either the NFVO just accepts that, as in FIG. 16 or the NFVO modifies the network service, overruling the VNFM decision, as in FIG. 17. For this latter case the overrule decision could be based on several aspects:

NFVO is aware that there is a geo-redundant setup for this VNF and the recovery for one of the VNFs would be of minor impact for the NS, or on site conditions with single, and even worse, multiple Virtualisation Containers hanging, unresponsiveness, failure conditions and so on. Here an extreme recovery mechanism could be required, preserving, at the same time, the already established relationship between VNFs (and PNFs) under NFVO control, the architectural logic and so on. Even a single HW board or a cabinet failure can trigger overrule.

Alternatively, the override indication could be enforced from the outset as follows. The NFVO initiates the checks with VNFM for a particular VNF in respect of a planned adjustment using inter NFVI-PoP migration. The information is enforced stating that change is mandatory and cannot be postponed. The VNFM interacts on VNF level with the EM. The EM instructs the VNFM about the outcome. The EM may also send information about the type of impact to be expected on the VNF.

In case of suspected/possible Network Service (NS) level unavailability during NFVI-PoP (internal) resource reallocation, or simply because so instructed by configuration option, the VNFM informs the NFVO. The message to the NFVO also includes information about the type of impact to be expected for the VNF e.g. loss of VNF connectivity or performance degradation. The NFVO analyses impacts on the network service (NS), the defined relationship between VNFs (and PNFs) under NFVO control, the architectural logic and so on. Then it acts by re-shuffling the NS to enable the change in the underlying infrastructure, without waiting for any negotiation about whether the adjustment should take place. The NFVO replies to VNFM, and the VNFM replies through NFVO to the VIM to implement the planned adjustment. After recovery of the VNF, the VNFM contacts the NFVO to adapt the network service, considering full recovery of the VNF.

FIGS. 21 to 25, Apparatus Features

Figure 21:
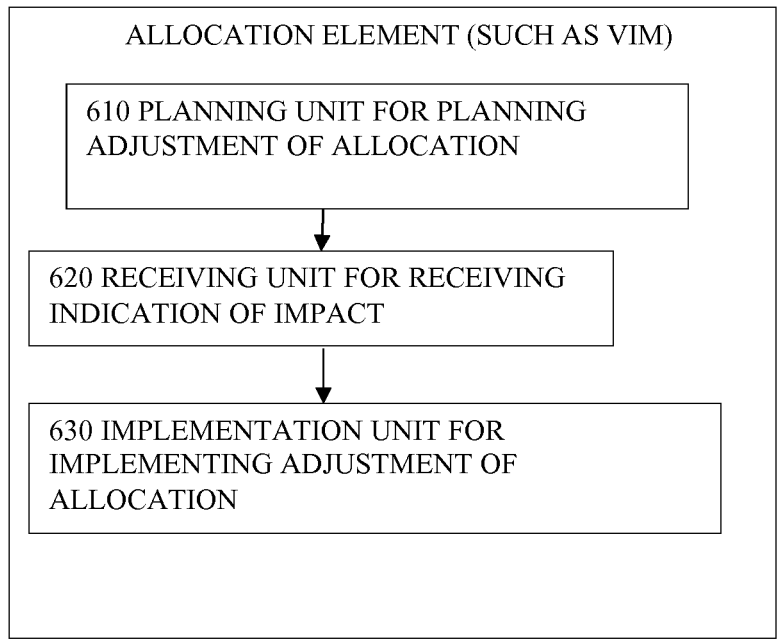
FIGS. 21 to 25 show schematic views of apparatus features of embodiments.

FIG. 21 shows a schematic view of an example of an allocation element such as a VIM or in some cases an NFVO. It shows a planning unit 610 for planning adjustment of the allocation and for starting the check for NS impact. This is coupled to a receiving unit 620 for receiving an indication based on the impact. This is coupled to an implementation unit 630 for implementing the planned adjustment of the allocation. It will be understood that the units illustrated in FIGS. 21 to 25 are functional units, and may be realised in any appropriate combination of hardware and/or software. The units may comprise one or more processors and may be integrated to any degree.

Figure 22:
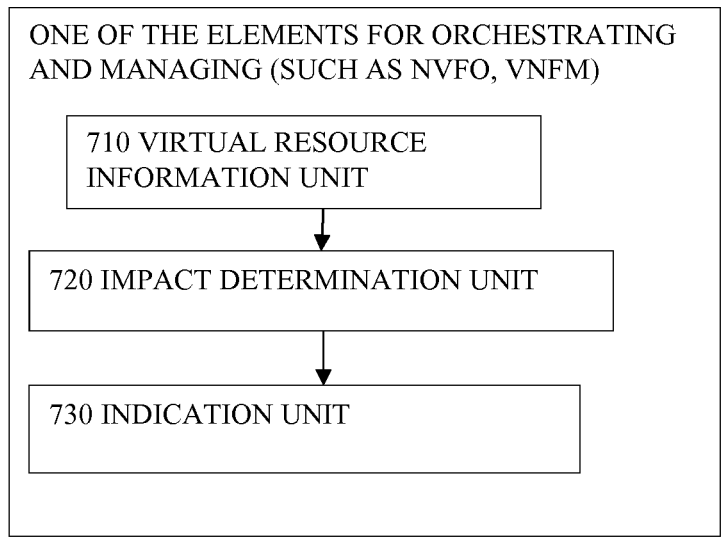

FIG. 22 shows a schematic view of an example of an element of the NFV-MANO for orchestrating or managing, such as an VNFM or an NFVO. It shows some of the internal functional parts of the element, provided in addition to the usual functions of the element for orchestrating either at the NS level (in the case of the NVFO), or managing at the VNF level (in the case of the VNFM). There is a virtual resource information unit 710 for obtaining information about which virtual resources could be affected by a planned adjustment. This is coupled to an impact determination unit 720 for determining an impact of the planned adjustment on the NS. This is in turn coupled to an indication unit 730 having a transmitting part for sending the indication based on the impact to the allocation element. The various units can be operative to carry out respective functions as described above in more detail in relation to FIGS. 6 to 13.

For the case that the element is an NFVO, the virtual resource information unit 710 can have a receiver for obtaining the information by receiving it from the VNFM, either prompted by the allocation element or prompted by a request from the virtual resource information unit to the VNFM. This information can then be used by the impact determination unit 720 to determine the impact. For the case that element is a VNFM, the virtual resource information unit 710 can obtain the information itself. The impact determination unit 720 would have a transmitter to send a request to the NFVO to provide the determination of impact on the NS. The impact determination unit 720 would also have a receiver to receive the impact from the NFVO so that the indication unit 730 of the VNFM can send the indication to the allocation element.

Figure 23:
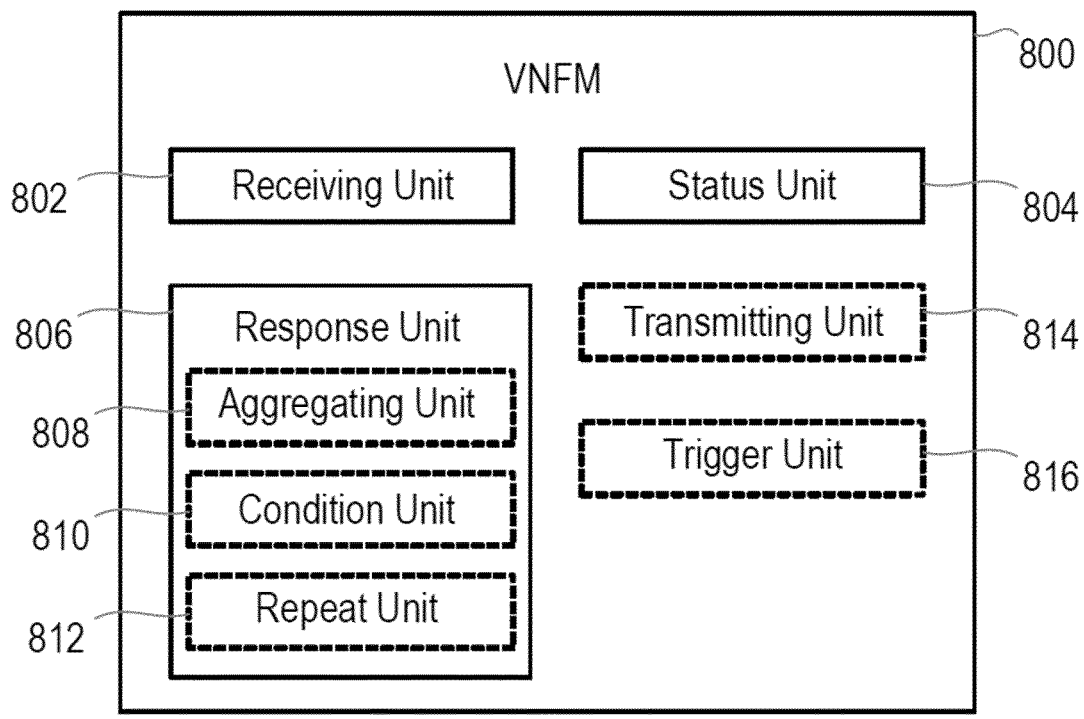

FIG. 23 shows a schematic view of another example of a VNFM 800. This can be used for obtaining information about which VNFs could be affected, and can cooperate with the NFVO either by following a request from the NFVO, as described above in relation to FIG. 11, or the VNFM can request the NFVO to determine the impact on the NS, as described above in relation to FIG. 12. This VNFM comprises a receiving unit 802 for receiving a request for permission to perform a planned resource allocation adjustment which will affect the VNF managed by the VNFM. The VNFM 800 also comprises a status unit 804 for checking an operational status of the VNF, and a response unit 806 for responding to the request on the basis of the operational status of the VNF. The response unit 806 may be for establishing a response on the basis of the operational status of the VNF, and sending the response to the NFVO element, for example via a transmitting unit 814. The response unit 806 may send the response to the NFVO element only if the response comprises granting the requested permission.

The status unit 804 may be for requesting operational status information for the VNF, for example by sending a request for operational status information of the VNF to an EM associated with the VNF or to the VNF directly. The status unit 804 may also be for receiving operational status information for the VNF. The response unit 806 may be for determining, on the basis of the operational status information for the VNF, whether the VNF can accommodate the planned resource allocation adjustment without a reduction in service level of the VNF that exceeds a threshold level. The operational status information comprises at least one of operational status information for the entire VNF, operational status information for individual components of the VNF, or operational status information for individual component instances of the VNF.

The response unit may comprise an aggregating unit, and, if the operational status information comprises operational status information for individual components or component instances of the VNF, the response unit 806 may be for establishing a component response for each component or component instance of the VNF and the aggregating unit 808 may be for aggregating the component responses to form a complete function response for the VNF. The status unit 804 may also be for requesting whether the VNF can accommodate the planned resource allocation adjustment without a reduction in service level of the VNF that exceeds a threshold level, for example by sending a request to the VNF or an EM associated with the VNF. The response unit 806 may be for receiving an indication as to whether the VNF can accommodate the planned resource allocation adjustment without a reduction in service level of the VNF that exceeds a threshold level. The response unit 806 may be for receiving a component indication for each component or component instance of the VNF with the aggregating unit 808 being for aggregating the component responses to form a complete function indication for the VNF. The response unit 806 may also be for receiving a complete function indication for the VNF. The VNFM may further comprise a trigger unit 816 for triggering preparatory actions in the VNF, for example by sending a trigger message to a VNF or to an EM associated with the VNF. The transmitting unit 814 may be for informing the NFVO element that preparatory actions are taking place in the VNF. The trigger unit may also be for receiving confirmation that the triggered preparatory actions have been completed, and, on receipt of the confirmation, causing the transmitting unit to send the established response to the NFVO element.

The receiving unit 802 may also be for receiving confirmation from the NFVO element that the planned resource allocation adjustment has been completed, and the trigger unit 816 may be for triggering clean up actions at the VNF on receipt of the confirmation from the NFV MANO element that the planned resource allocation adjustment has been completed. The trigger unit 816 may also be for receiving confirmation that the clean up actions have been completed. The response unit 806 may also comprise a condition unit 810 for attaching a condition to the permission. The response unit 806 may also comprise a repeat unit for attaching a repeat time to a negative response to the request, after which the request may be repeated.

Figure 24:
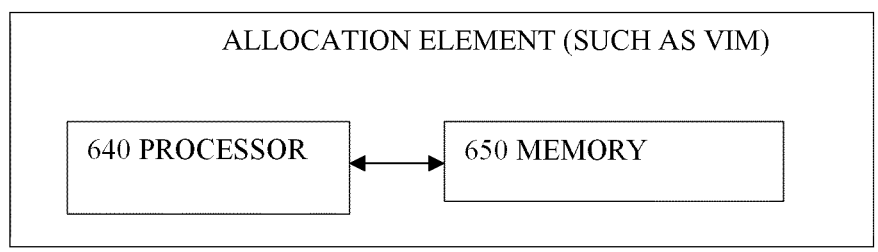
Figure 25:
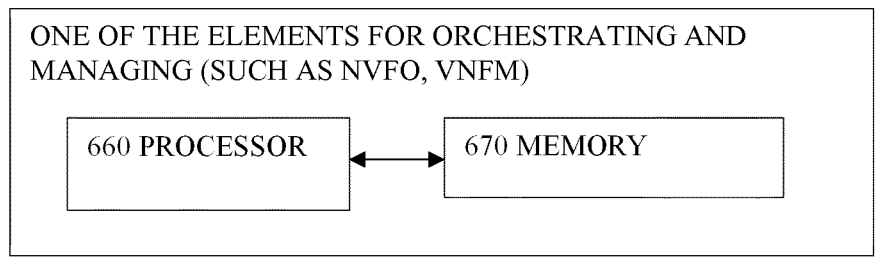

FIG. 24 shows a schematic view of an allocation element having a processor 640 coupled to a memory 650, the memory having instructions for execution by the processor to implement functions described above. FIG. 25 shows an element for orchestrating, having a processor 660 coupled to a memory 670, the memory having instructions for execution by the processor to implement functions described above.

Applications

The following example illustrates an operational scenario which may be managed according to the methods discussed above. A scalable telephony system has some VNFs which handle customer visible features and thus are more critical than others which handle back office functions not visible or critical to maintaining a call. The NVFO is aware which VNFs are the more critical ones. Thus when it is notified that a given VNF is to be affected by a requested resource allocation adjustment, it can grant permission for the less critical VNFs. In order to allow graceful disconnection of ongoing telephony calls, the more critical VNF can be transferred into an isolation state for a delay period as part of preparatory operations before it is allowed to be affected. This allows ongoing services to terminate naturally, while new service requests are handled by other VNFs.

CONCLUDING REMARKS

Above have been described examples based on a concept of a "courteous cloud provider": When the VIM (acting on behalf of "the cloud infrastructure") wants to perform actions that could negatively impact a VNF or cause a domino-effect on services on network level, then the VNFM and the NFVO gets the opportunity to delay such actions or to perform some preparatory actions that may comprise any kind of VNF application-level or network level operational procedures. In particular network level procedures (e.g. Network Healing, adjustment of relationship between VNFs (and PNFs), or even assigned of resources to a specific logical network over multiple PODs and locations) can also be induced as direct request from VIM to NFVO when specific infrastructure conditions occur and network level services shall be preserved.

As has been described, a system and/or method are provided for VNF-NFVI synchronization configuration, with and without the help of the VNFM, based on ETSI NFV standard. Examples have been described of control mechanisms over the interfaces listed above so that every planned maintenance operation (or any normal operation which is postponable and might lead to an impact on an NS, (such as observed slow deterioration over time of a Virtualisation Container leading to a postponable restart operation for that Virtualisation Container) is done in accordance to the NFV and to the Network Service need and in avoidance of any undue impact on running operations. As a general approach every planned adjustment operation could include a check on whether it is possible to run it, depending on the characteristics and the status of each NFV function potentially affected by the change and depending on the impact such operation will have on the network service. In order to avoid deadlocks, there can be provided timers or delays in the above mentioned mechanisms.

In the described examples, the communication between VIM and VNFM can either be direct ("Virtualised Resource Management in direct mode") or through the NVFO ("Virtualised Resource Management in indirect mode"). The following consequences of features described can be identified:

1. Improved in service performance of the virtualised telecom system;
2. Can be easily extended to include additional logic covering additional needs/use cases;
3. Supports the co-existence and transition from Physical Network Function (PNF) to VNF, with seamless ISP support;
4. Enhanced support for separation of infrastructure administrative domain from tenant administrative domain. Infrastructure operations can automatically consider application specific requirements;
5. Can achieve more automation and simplicity E2E. Truly a contributor to OPEX and CAPEX promise of "Telecom Cloud" solutions;
6. Solution conforms to ETSI MANO architecture for virtualisation of telecom applications and can be made part of the standard; and
7. Mitigation of potential non-trust relationship between VIM/NFVI and VNFM/NFVO/VNF by extending control loop to VNFM/NFVO/VNF.

Other variations can be envisaged within the claims.

The invention claimed is:

1. A method performed by at least one element in a Network Functions Virtualisation Management and Orchestration system (NFV-MANO) for managing resources in a Network Function Virtualisation Infrastructure (NFVI) to provide network services, the at least one element being configured to orchestrate and manage virtual resources to provide a network service, the method comprising:
    obtaining information about which of the virtual resources could be affected by a planned adjustment of an allocation of physical resources associated with the virtual resources;
    determining an impact of the planned adjustment on a network service, based on the information about which of the virtual resources could be affected; and
    sending, to an allocation element configured to manage the allocation of physical resources associated with the virtual resources, an indication based on the impact on the network service, wherein the indication comprises a request to proceed with the planned adjustment after a requested delay.

2. The method of claim 1, further comprising assessing an acceptability of the determined impact, wherein the indication based on the impact, further comprises an indication of the acceptability of the determined impact.

3. The method of claim 1, further comprising receiving an indication of a priority level of the planned adjustment of the allocation, wherein sending the indication based on the impact is carried out based on the priority level.

4. The method of claim 3, further comprising determining whether to adapt the network service to compensate for the planned adjustment of the allocation, based on the determined impact on the network service and on the indication of priority level.

5. A method performed by an allocation element of a Network Functions Virtualisation Management and Orchestration system (NFV-MANO) that is configured to manage resources in a Network Function Virtualisation Infrastructure (NFVI), the allocation element being configured to manage an allocation of physical resources associated with virtual resources, the method comprising:
    sending, to an element of the NFV-MANO that is configured to orchestrate and manage the virtual resources to provide a network service, information about a planned adjustment of the allocation of physical resources associated with the virtual resources;
    receiving, from the element, an indication based on an impact on the network service, wherein the impact on the network service is based on information about which of the virtual resources could be affected by the planned adjustment, wherein the indication comprises a request to proceed with the planned adjustment after a requested delay; and
    implementing the planned adjustment of the allocation of physical resources after the requested delay according to the indication based on the impact on the network service.

6. The method of claim 5, wherein the indication based on the impact further comprises an indication of the acceptability of the impact on the network service.

7. The method of claim 6, wherein:
    the element is configured to orchestrate and manage comprises a Network Function Virtualisation Orchestrator (NFVO); and
    the indication based on the impact is received from the NFVO.

8. The method of claim 6, wherein:
    the allocation element comprises a Virtual Infrastructure Manager (VIM); and
    the VIM performs the operations of: sending the information about the planned adjustment, receiving the indication based on the impact, and implementing the planned adjustment of the allocation.

9. The method of claim 5, wherein
    the information about the planned adjustment of the allocation comprises an indication of a priority level of the planned adjustment of the allocation.

10. An element of a Network Functions Virtualisation Management and Orchestration system (NFV-MANO) that is configured to manage resources in a Network Function Virtualisation Infrastructure (NFVI), the element being configured to orchestrate and manage virtual resources to provide a network service and comprising:
    processing resources provided by one or more physical processors; and storage resources provided by one or more memories, the storage resources storing computer-executable instructions that, when executed by the processing resources, configures the element to:

obtain information about which of the virtual resources could be affected by a planned adjustment of an allocation of physical resources associated with the virtual resources;

determine an impact on a network service, based on the information about which of the virtual resources could be affected by the planned adjustment of the allocation; and send, to an allocation element configured to manage the allocation of physical resources associated with the virtual resources, an indication based on the impact on the network service, wherein the indication comprises a request to proceed with the planned adjustment after a requested delay.

11. The element of claim 10, wherein execution of the instructions further configures the element to assess an acceptability of the determined impact; and wherein the indication further comprises an indication of the acceptability of the determined impact.

12. The element of claim 10, wherein execution of the instructions further configures the element to: receive an indication of a priority level of the planned adjustment of the allocation; and send the indication based on the impact according to the indicated priority level.

13. The element of claim 12, wherein execution of the instructions further configures the element to determine whether to adapt the network service to compensate for the planned adjustment of the allocation, based on the determined impact on the network service and on the indication of priority level.

14. An allocation element of a Network Functions Virtualisation Management and Orchestration system (NFV-MANO) that is configured to manage resources in a Network Function Virtualisation Infrastructure (NFVI), the allocation element being configured to manage an allocation of physical resources associated with virtual resources and comprising:

processing resources provided by one or more processors; and storage resources provided by one or more memories, the storage resources storing computer-executable instructions that, when executed by the processing resources, configures the allocation element to:

send, to an element of the NFV-MANO that is configured to orchestrate and manage the virtual resources to provide a network service, information about a planned adjustment of the allocation of physical resources associated with the virtual resources;

receive, from the element, an indication based on an impact on the network service, wherein the impact on the network service is based on information about which of the virtual resources could be affected by the planned adjustment, wherein the indication comprises a request to proceed with the planned adjustment after a requested delay; and implement the planned adjustment of the allocation of physical resources after the requested delay according to the indication based on the impact on the network service.

15. The allocation element of claim 14, wherein execution of the instructions further configures the allocation element to send the information about the planned adjustment of the allocation so as to include an indication of a priority level of the planned adjustment of the allocation.

16. The allocation element of claim 14, wherein execution of the instructions configures the allocation element to implement the planned adjustment of the allocation by any one of the following: overriding an unfavourable indication based on the impact, amending the planned adjustment, and obtaining information about which of the virtual resources are more critical to the impact than others of the virtual resources.

* * * * *